US009472051B2

(12) United States Patent
Frank et al.

(10) Patent No.: US 9,472,051 B2
(45) Date of Patent: Oct. 18, 2016

(54) GAMING SYSTEM, GAMING DEVICE AND METHOD PROVIDING ACCUMULATION GAME

(71) Applicant: IGT, Las Vegas, NV (US)

(72) Inventors: Gregory F. Frank, Walnut Creek, CA (US); Christopher T. Brune, Carson City, NV (US); Ryan W. Cuddy, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 15/002,025

(22) Filed: Jan. 20, 2016

(65) Prior Publication Data

US 2016/0140805 A1 May 19, 2016

Related U.S. Application Data

(63) Continuation of application No. 14/737,062, filed on Jun. 11, 2015, which is a continuation of application No. 14/257,304, filed on Apr. 21, 2014, now Pat. No. 9,142,095, which is a continuation of application No. 13/763,209, filed on Feb. 8, 2013, now Pat. No. 8,734,224, which is a continuation of application No. 13/342,693, filed on Jan. 3, 2012, now Pat. No. 8,393,952, which is a continuation of application No. 12/268,877, filed on Nov. 11, 2008, now Pat. No. 8,109,824.

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.
CPC ....... *G07F 17/3244* (2013.01); *G07F 17/3213* (2013.01); *G07F 17/3267* (2013.01); *G07F 17/34* (2013.01)

(58) Field of Classification Search
CPC . G07F 17/3211; G07F 17/3267; G07F 17/34
USPC .................................................... 463/20, 25
See application file for complete search history.

(56) References Cited

U.S. PATENT DOCUMENTS 4,618,150 A 10/1986 Kimura
4,624,459 A 11/1986 Kaufman (Continued)

FOREIGN PATENT DOCUMENTS

EP 0 874 337 10/1998
EP 0 945 837 9/1999

(Continued)

OTHER PUBLICATIONS

Ghost Hunter Advertisement written by Atronic, published in 2003.

(Continued)

*Primary Examiner* — Michael Grant
(74) *Attorney, Agent, or Firm* — Neal, Gerber & Eisenberg LLP

(57) ABSTRACT

A gaming system and method enables a player to assign at least one amplifier to at least one accumulator. In one embodiment, the amplifier causes an increase in the rate of advancement for the accumulator. In one embodiment, the gaming system provides the player any awards associated with the level of one or more of the accumulators.

30 Claims, 30 Drawing Sheets

(56) References Cited

U.S. PATENT DOCUMENTS 4,695,053 A 9/1987 Vazquez, Jr. et al.
5,046,737 A 9/1991 Fienberg
5,205,555 A 4/1993 Hamano
5,294,120 A 3/1994 Schultz
5,342,047 A 8/1994 Heidel et al.
5,449,173 A 9/1995 Thomas et al.
5,511,781 A 4/1996 Wood et al.
5,536,016 A 7/1996 Thompson
5,560,603 A 10/1996 Seelig et al.
5,762,552 A 6/1998 Vuong et al.
5,769,716 A 6/1998 Saffari et al.
5,823,873 A 10/1998 Moody
5,823,874 A 10/1998 Adams
5,833,538 A 11/1998 Weiss
5,848,932 A 12/1998 Adams
5,873,781 A 2/1999 Keane
5,882,261 A 3/1999 Adams
5,927,714 A 7/1999 Kaplan
5,951,397 A 9/1999 Dickinson
5,967,894 A 10/1999 Kinoshita et al.
5,976,016 A 11/1999 Moody et al.
5,984,781 A 11/1999 Sunaga
5,997,400 A 12/1999 Seelig et al.
6,004,207 A 12/1999 Wilson, Jr. et al.
6,015,346 A 1/2000 Bennett
6,033,307 A 3/2000 Vancura
6,056,642 A 5/2000 Bennett
6,062,980 A 5/2000 Luciano
6,089,976 A 7/2000 Schneider et al.
6,089,977 A 7/2000 Bennett
6,089,978 A 7/2000 Adams
6,102,798 A 8/2000 Bennett
6,120,031 A 9/2000 Adams
6,120,378 A 9/2000 Moody et al.
6,126,542 A 10/2000 Fier
6,142,874 A 11/2000 Kodachi et al.
6,155,925 A 12/2000 Giobbi et al.
6,159,097 A 12/2000 Gura
6,159,098 A 12/2000 Slomiany et al.
6,164,652 A 12/2000 Lauretta et al.
6,168,523 B1 1/2001 Piechowiak et al.
6,174,235 B1 1/2001 Walker et al.
6,186,894 B1 2/2001 Mayeroff
6,190,254 B1 2/2001 Bennett
6,190,255 B1 2/2001 Thomas et al.
6,231,442 B1 5/2001 Mayeroff
6,231,445 B1 5/2001 Acres
6,234,897 B1 5/2001 Frohm et al.
6,261,177 B1 7/2001 Bennett
6,299,165 B1 10/2001 Nagano
6,302,790 B1 10/2001 Brossard
6,309,300 B1 10/2001 Glavich
6,311,976 B1 11/2001 Yoseloff et al.
6,312,334 B1 11/2001 Yoseloff
6,315,664 B1 11/2001 Baerlocher et al.
6,319,124 B1 11/2001 Baerlocher et al.
6,328,644 B1 12/2001 Kuramochi et al.
6,328,649 B1 12/2001 Randall et al.
6,336,860 B1 1/2002 Webb
6,346,043 B1 2/2002 Colin et al.
6,386,975 B1 5/2002 Peterson
6,394,902 B1 5/2002 Glavich et al.
6,398,218 B1 6/2002 Vancura
6,413,161 B1 7/2002 Baerlocher et al.
6,443,452 B1 9/2002 Brune
6,561,904 B2 5/2003 Locke et al.
6,569,015 B1 5/2003 Baerlocher et al.
6,575,830 B2 6/2003 Baerlocher et al.
6,599,185 B1 7/2003 Kaminkow et al.
6,602,137 B2 8/2003 Kaminkow et al.
6,634,943 B1 10/2003 Baerlocher
6,638,164 B2 10/2003 Randall et al.
6,641,477 B1 11/2003 Dietz, II
6,726,525 B1 4/2004 Kato et al.
6,726,563 B1 4/2004 Baerlocher et al.
6,726,565 B2 4/2004 Hughs-Baird
6,749,504 B2 6/2004 Hughs-Baird
6,769,983 B2 8/2004 Slomiany
6,796,899 B2 9/2004 Baerlocher
6,796,900 B2 9/2004 Baerlocher et al.
6,814,664 B2 11/2004 Baerlocher et al.
6,817,944 B2 11/2004 Kaminkow et al.
6,837,788 B2 1/2005 Cannon
6,875,108 B1 4/2005 Hughs-Baird
6,899,620 B2 5/2005 Kaminkow et al.
6,910,965 B2 6/2005 Downes
6,913,532 B2 7/2005 Baerlocher et al.
6,939,224 B2 9/2005 Palmer et al.
6,955,600 B2 10/2005 Glavich et al.
6,958,013 B2 10/2005 Miereau et al.
6,971,954 B2 12/2005 Randall et al.
6,971,955 B2 12/2005 Baerlocher et al.
6,979,263 B2 12/2005 Baerlocher et al.
7,011,581 B2 3/2006 Cole et al.
7,029,395 B1 4/2006 Baerlocher
7,033,270 B2 4/2006 Baerlocher et al.
7,040,984 B2 5/2006 Mead
7,056,214 B2 6/2006 Miereau et al.
7,066,466 B1 6/2006 Stavinsky et al.
7,066,814 B2 6/2006 Glavich et al.
7,094,148 B2 8/2006 Baerlocher et al.
7,121,942 B2 10/2006 Baerlocher et al.
7,153,205 B2 12/2006 Baerlocher et al.
7,160,188 B2 1/2007 Kaminkow et al.
7,172,506 B2 2/2007 Baerlocher et al.
7,223,172 B2 5/2007 Baerlocher et al.
7,235,011 B2 6/2007 Randall et al.
7,238,110 B2 7/2007 Glavich et al.
7,247,092 B2 7/2007 Jarvis et al.
7,252,590 B2 8/2007 Palmer et al.
7,258,611 B2 8/2007 Bigelow, Jr. et al.
7,300,348 B2 11/2007 Kaminkow et al.
7,306,518 B2 12/2007 Hughs-Baird et al.
7,331,867 B2 2/2008 Baerlocher et al.
7,338,367 B2 3/2008 Kaminkow et al.
7,338,369 B2 3/2008 Mierau et al.
7,374,486 B2 5/2008 Baerlocher
7,381,134 B2 6/2008 Cuddy et al.
7,399,228 B2 7/2008 Baerlocher
7,419,162 B2 9/2008 Lancaster et al.
7,976,371 B2 7/2011 Izumi et al.
8,109,824 B2 2/2012 Frank et al.
8,393,952 B2 3/2013 Frank et al.
2002/0042296 A1* 4/2002 Walker .................... G07F 17/32
463/23
2003/0036422 A1 2/2003 Baerlocher et al.
2003/0036424 A1 2/2003 Baerlocher
2003/0060266 A1 3/2003 Baerlocher
2003/0073477 A1 4/2003 Baerlocher et al.
2003/0162584 A1 8/2003 Hughs-Baird et al.
2003/0181233 A1 9/2003 Baerlocher et al.
2003/0216167 A1 11/2003 Gauselmann
2004/0002376 A1 1/2004 Swift et al.
2004/0195773 A1 10/2004 Masci et al.
2004/0242316 A1 12/2004 Oles et al.
2004/0266516 A1 12/2004 Thomas
2004/0266517 A1 12/2004 Bleich et al.
2005/0033461 A1 2/2005 Gerrard et al.
2005/0043082 A1 2/2005 Peterson et al.
2005/0054416 A1 3/2005 Hostetler et al.
2005/0054426 A1 3/2005 Toyoda
2005/0054434 A1 3/2005 Baerlocher et al.
2005/0059455 A1 3/2005 Gerrard et al.
2005/0059461 A1 3/2005 Ching et al.
2005/0075163 A1 4/2005 Cuddy et al.
2005/0096123 A1 5/2005 Cretans et al.
2005/0159200 A1 7/2005 Nicely et al.
2006/0025196 A1 2/2006 Webb et al.
2006/0063582 A1 3/2006 Baerlocher et al.
2006/0068882 A1 3/2006 Baerlocher et al.
2006/0068893 A1 3/2006 Jaffe et al.
2006/0073871 A1 4/2006 Rodgers et al.
2006/0073877 A1 4/2006 Rodgers et al.
2006/0084486 A1 4/2006 Belger et al.

(56) References Cited

U.S. PATENT DOCUMENTS

| | | | | |
|---|---|---|---|---|
| 2006/0111164 | A1 | 5/2006 | Hornik et al. | |
| 2006/0142077 | A1* | 6/2006 | Miles | G07F 17/32 463/20 |
| 2006/0246977 | A1 | 11/2006 | Cannon | |
| 2006/0287035 | A1 | 12/2006 | Walker et al. | |
| 2007/0054733 | A1 | 3/2007 | Baerlocher | |
| 2007/0060297 | A1 | 3/2007 | Hein et al. | |
| 2007/0077979 | A1 | 4/2007 | Cohn et al. | |
| 2007/0105619 | A1 | 5/2007 | Kniesteadt et al. | |
| 2007/0167223 | A1 | 7/2007 | Bleich et al. | |
| 2007/0184891 | A1 | 8/2007 | Thomas | |
| 2008/0113779 | A1 | 5/2008 | Cregan | |
| 2008/0188289 | A1 | 8/2008 | Baerlocher | |
| 2008/0194316 | A1 | 8/2008 | Baerlocher | |
| 2008/0194317 | A1 | 8/2008 | Baerlocher | |
| 2008/0214280 | A1 | 9/2008 | Baerlocher | |
| 2008/0318668 | A1 | 12/2008 | Ching et al. | |
| 2009/0017902 | A1 | 1/2009 | Fujimoto et al. | |
| 2009/0104959 | A1 | 4/2009 | Caputo et al. | |
| 2009/0131145 | A1 | 5/2009 | Aoki et al. | |
| 2009/0247271 | A1 | 10/2009 | Olive et al. | |
| 2010/0081497 | A1 | 4/2010 | Wolf et al. | |
| 2010/0120495 | A1 | 5/2010 | Frank et al. | |
| 2010/0120525 | A1 | 5/2010 | Baerlocher et al. | |
| 2012/0100914 | A1 | 4/2012 | Frank et al. | |

FOREIGN PATENT DOCUMENTS

| | | |
|---|---|---|
| EP | 0 984 409 | 3/2000 |
| GB | 2 086 631 | 5/1982 |
| GB | 2 183 882 | 6/1987 |
| GB | 2 222 712 | 3/1990 |
| GB | 2 353 128 | 2/2001 |
| GB | 2 356 280 | 5/2001 |
| WO | WO 01/52956 | 7/2001 |

OTHER PUBLICATIONS

Red Baron, Article in Strictly Slots written by Aristocrat, published in Feb. 2005.

Letter from Marvin A. Motsenbocker of Mots Law dated Jun. 26, 2012 regarding Third Party Submission in Published Application Under 37 C.F.R. 1.99 filed for U.S. Appl. No. 13/342,693 (1 page).

Third Party Submission in Published Application Under 37 C.F.R. 1.99 filed for U.S. Appl. No. 13/342,693 and dated Jun. 26, 2012 (3 pages).

Partially-highlighted U.S. Patent Application Publication No. 2005/0054426 submitted with Third Party Submission in Published Application Under 37 C.F.R. § 1.99 for U.S. Appl. No. 13/342,693 and dated Jun. 26, 2012 (4 pages).

Partially-highlighted U.S. Pat. No. 7,976,371 submitted with Third Party Submission in Published Application Under 37 C.F.R. § 1.99 for U.S. Appl. No. 13/342,693 and dated Jun. 26, 2012 (3 pages).

* cited by examiner

GAMING SYSTEM, GAMING DEVICE AND METHOD PROVIDING ACCUMULATION GAME

PRIORITY CLAIM

This application is a continuation of, and claims priority to and the benefit of, U.S. patent application Ser. No. 14/737,062, which was filed on Jun. 11, 2015, which is a continuation of, and claims priority to and the benefit of, U.S. patent application Ser. No. 14/257,304, which was filed on Apr. 21, 2014 and issued as U.S. Pat. No. 9,142,095 on Sep. 22, 2015, which is a continuation of, and claims priority to and the benefit of, U.S. patent application Ser. No. 13/763,209, which was filed on Feb. 8, 2013 and issued as U.S. Pat. No. 8,734,224 on May 27, 2014, which is a continuation of, and claims priority to and the benefit of, U.S. patent application Ser. No. 13/342,693, which was filed on Jan. 3, 2012 and issued as U.S. Pat. No. 8,393,952 on Mar. 12, 2013, which is a continuation of, and claims priority to and the benefit of, U.S. patent application Ser. No. 12/268,877, which was filed on Nov. 11, 2008 and issued as U.S. Pat. No. 8,109,824 on Feb. 7, 2012, the entire contents of each of which are incorporated herein by reference.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In certain known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines).

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

To increase player enjoyment and excitement, it is desirable to provide players with new types of gaming devices that attract the player and keep the player entertained. Accordingly, a need exists for the further development of gaming devices.

SUMMARY

In one embodiment, the gaming system, gaming device and gaming method provides a game including a plurality of accumulators, one or more accumulator advancement triggering events associated with the accumulators, and a designated number of amplifiers which can each be associated or assigned to a designated number of the accumulators. In one embodiment, the gaming system enables the player to assign each amplifier to one of the accumulators. For each accumulator, when the accumulator advancement triggering event occurs for that accumulator, that accumulator advances. In one embodiment, when an amplifier is assigned to one of the accumulators, the amplifier causes an increase to the rate of advancement of that accumulator for a designated period. In one such embodiment, each of the accumulators have or are associated with a normal or default rate of advancement. In this embodiment, the rate of advancement increases because the accumulator increases at a greater rate than the normal rate of advancement if an accumulator advancement triggering event occurs for that accumulator. In another embodiment, when an amplifier is assigned to one of the accumulators, the rate of advancement increases because the accumulator advancement triggering event for that accumulator is likely to occur more often. In one embodiment, when a bonus triggering event occurs, the gaming system provides an award to the player based, at least in part, on the level of one or more of the plurality of the accumulators.

In one embodiment, the gaming system determines a number or quantity of amplifiers which can be assigned to the accumulators. In one such embodiment, the gaming system provides the quantity of amplifiers after the player deposits a designated amount of money with the gaming system. In another embodiment, the quantity of amplifiers provided to the player is determined based on any other suitable triggering event such as the gaming system generating three identical designated symbols.

After the assignment of the amplifier(s) to the accumulator(s), the gaming system displays one or more plays of the primary game. After displaying the play of the primary game, the gaming system provides any awards associated with the play of the primary game outcome.

For each accumulator, in one embodiment, the gaming system determines if any accumulator advancement triggering events occur for that accumulator. If any accumulator advancement triggering event occurs, the gaming system advances the accumulator associated with the accumulator advancement triggering event.

The accumulator advancement triggering event can be any suitable triggering event. In one embodiment, the accumulator advancement triggering event is based on a number of designated symbols generated in the play of the primary game, such as generated on a plurality of reels.

The bonus triggering event can be any suitable triggering event. In one embodiment, the bonus triggering event occurs if one of the accumulators reaches a designated level. In another embodiment, the bonus triggering event is based on a number of designated symbols generated in the play of the primary game, such as generated on a plurality of reels.

The awards associated with the accumulators can be any suitable awards. In one embodiment, a first accumulator is associated with extra bonus game free spins. A second accumulator is associated with extra paylines. A third accumulator is associated with a designated cash value.

The gaming system and method disclosed herein provides the player with a new and exciting game that enables the player to assign an amplifier to an accumulator associated with an award, wherein the assignment increases the player's chances of receiving the award associated with that accumulator. Such a configuration increases player excitement and enjoyment in playing the gaming system and method disclosed herein.

Additional features and advantages are described herein, and will be apparent from the following Detailed Description and the figures.

BRIEF DESCRIPTION OF THE FIGURES

FIGS. 4A, 4B, 4C, 4D, 4E, 4F, 4G, 4H, 41, 4J and 4K are front views of one embodiment of displays of the gaming system disclosed herein, illustrating the assigned amplifier causing the accumulator to increase at a greater rate.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
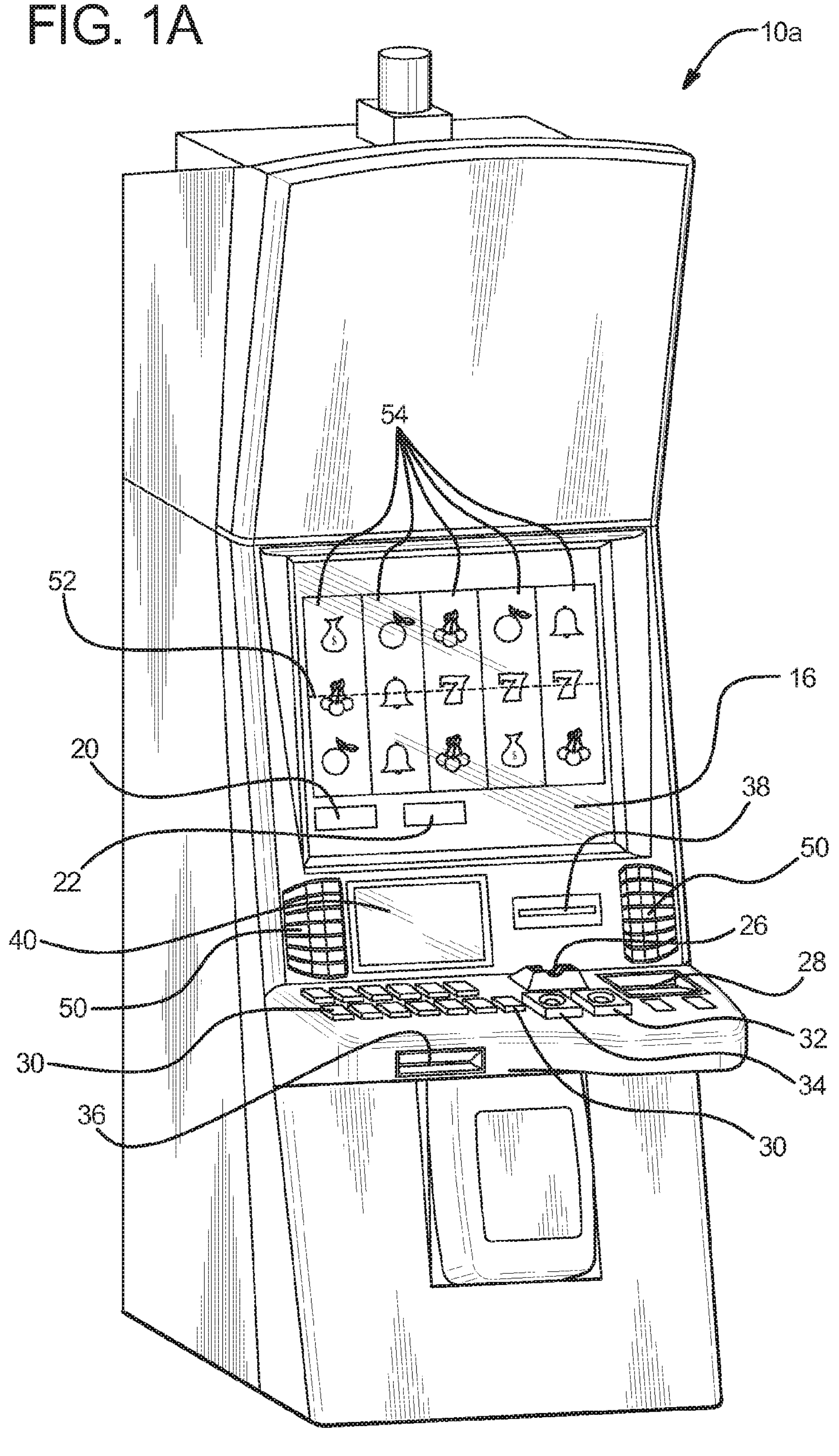
FIGS. 1A and 1B are front perspective views of alternative embodiments of gaming systems disclosed herein.
Figure 1B:
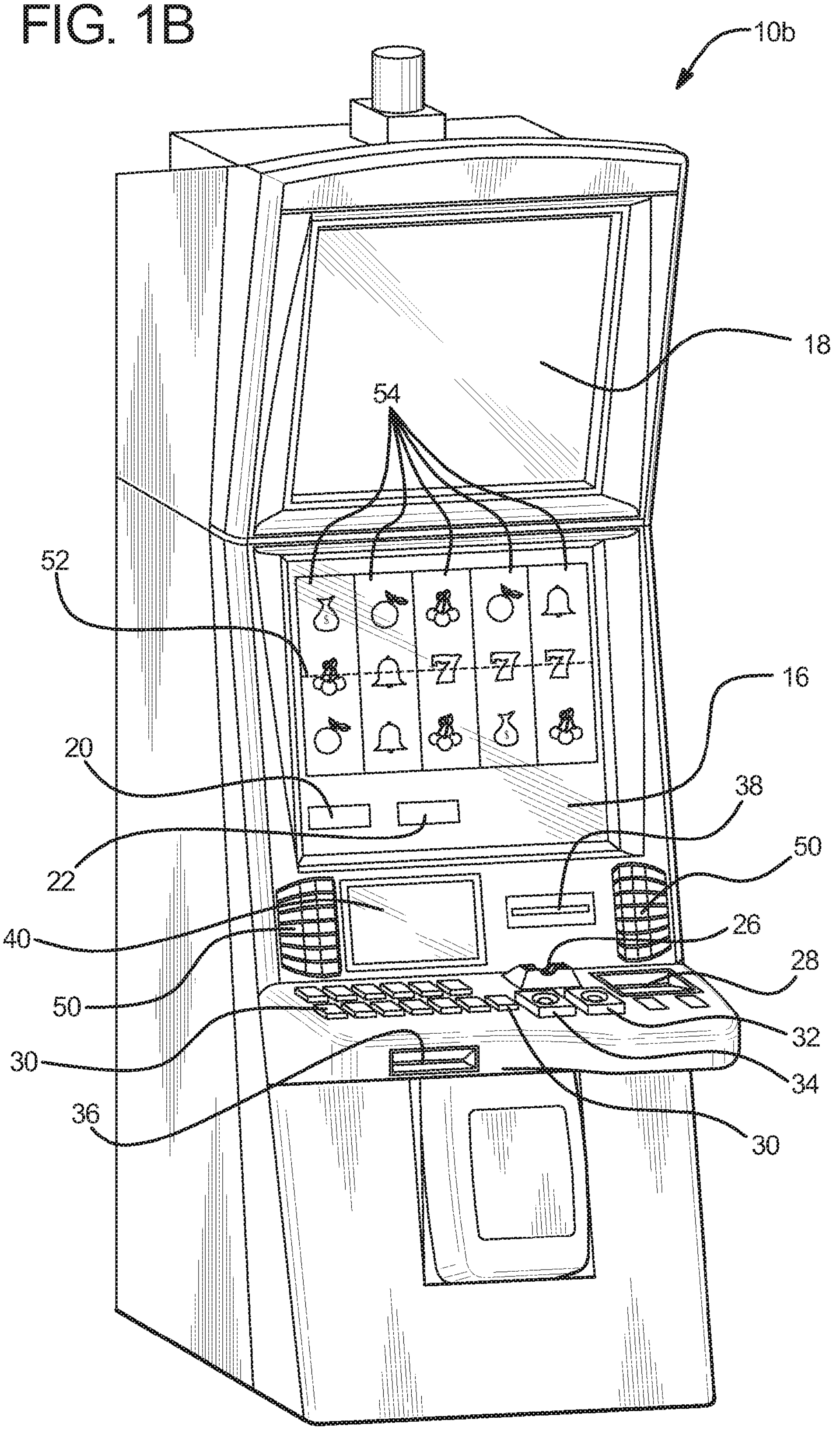

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
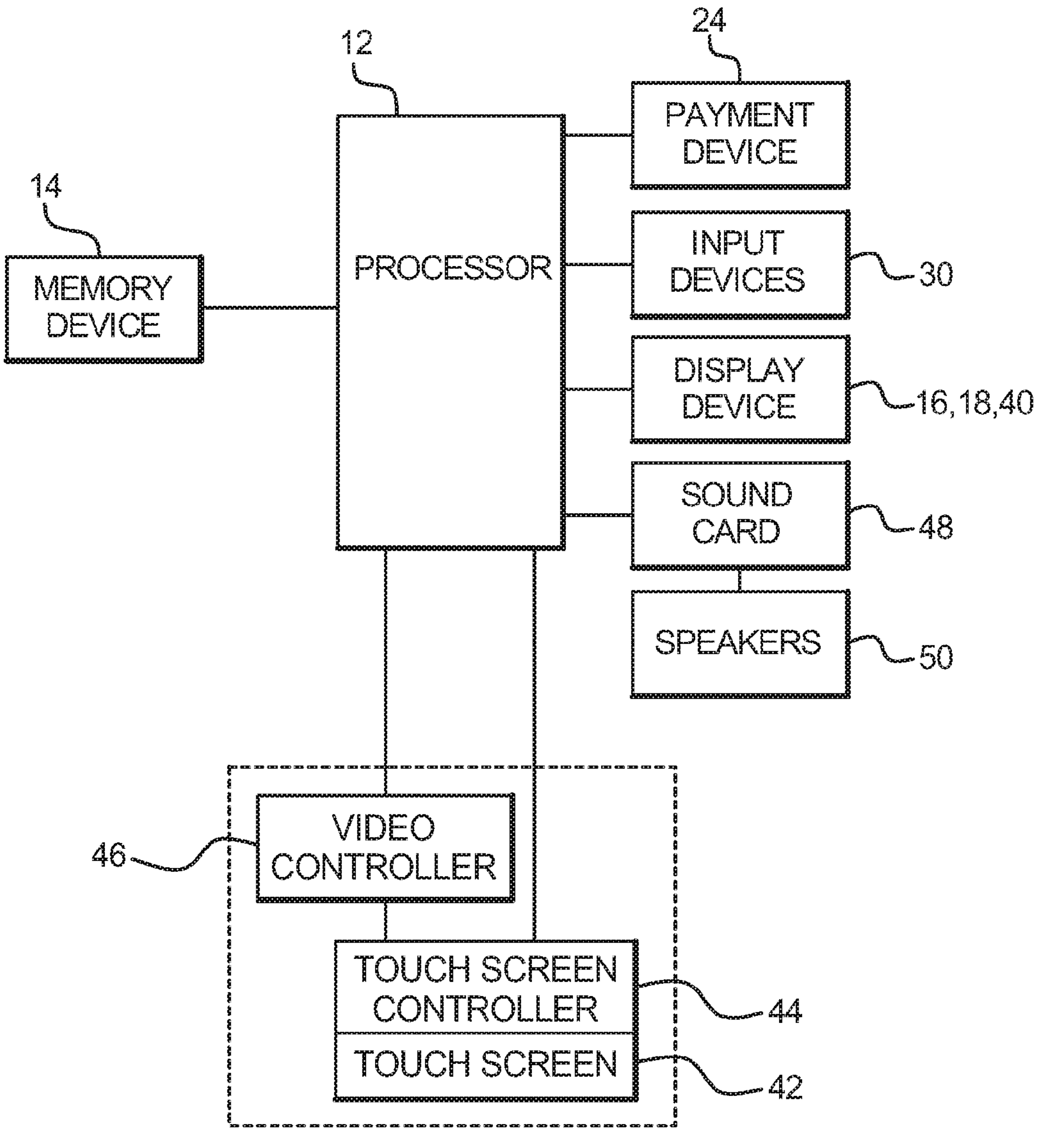
FIG. 2A is a schematic block diagram of the electronic configuration of one embodiment of a gaming system disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
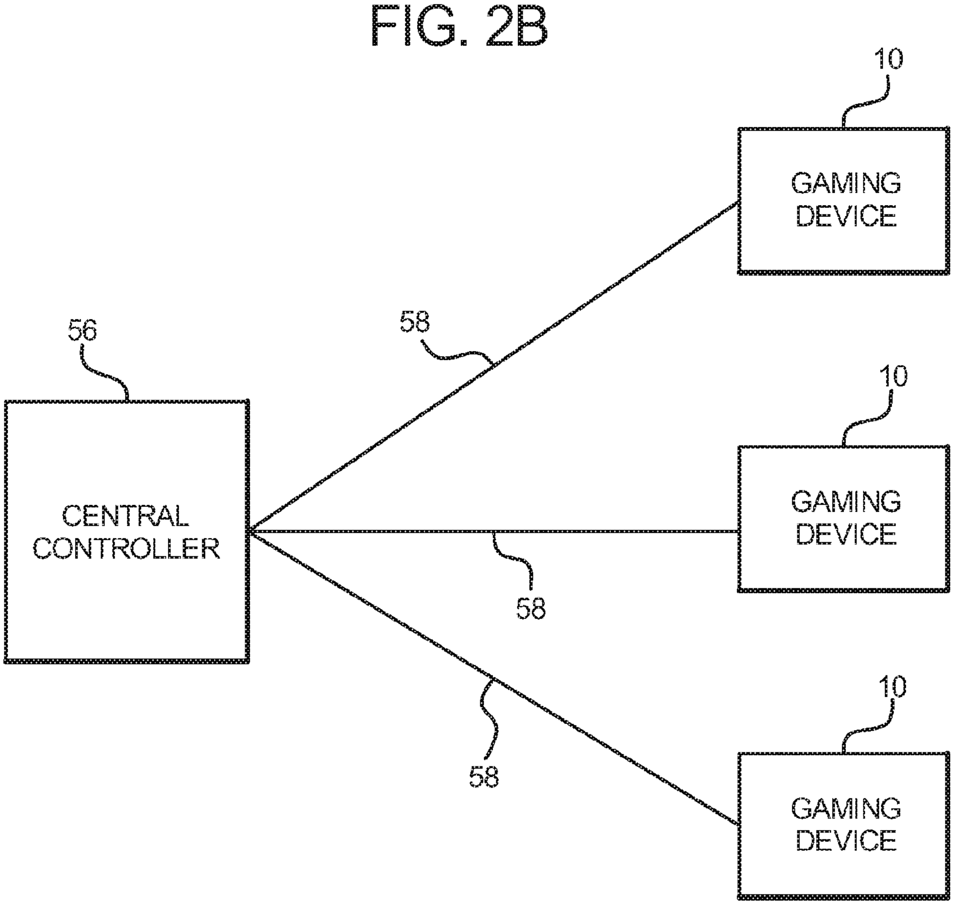
FIG. 2B is a schematic diagram of the central server in communication with a plurality of gaming systems in accordance with one embodiment of the gaming system disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device (s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Amplified Accumulator Example Embodiments

Figure 3A:
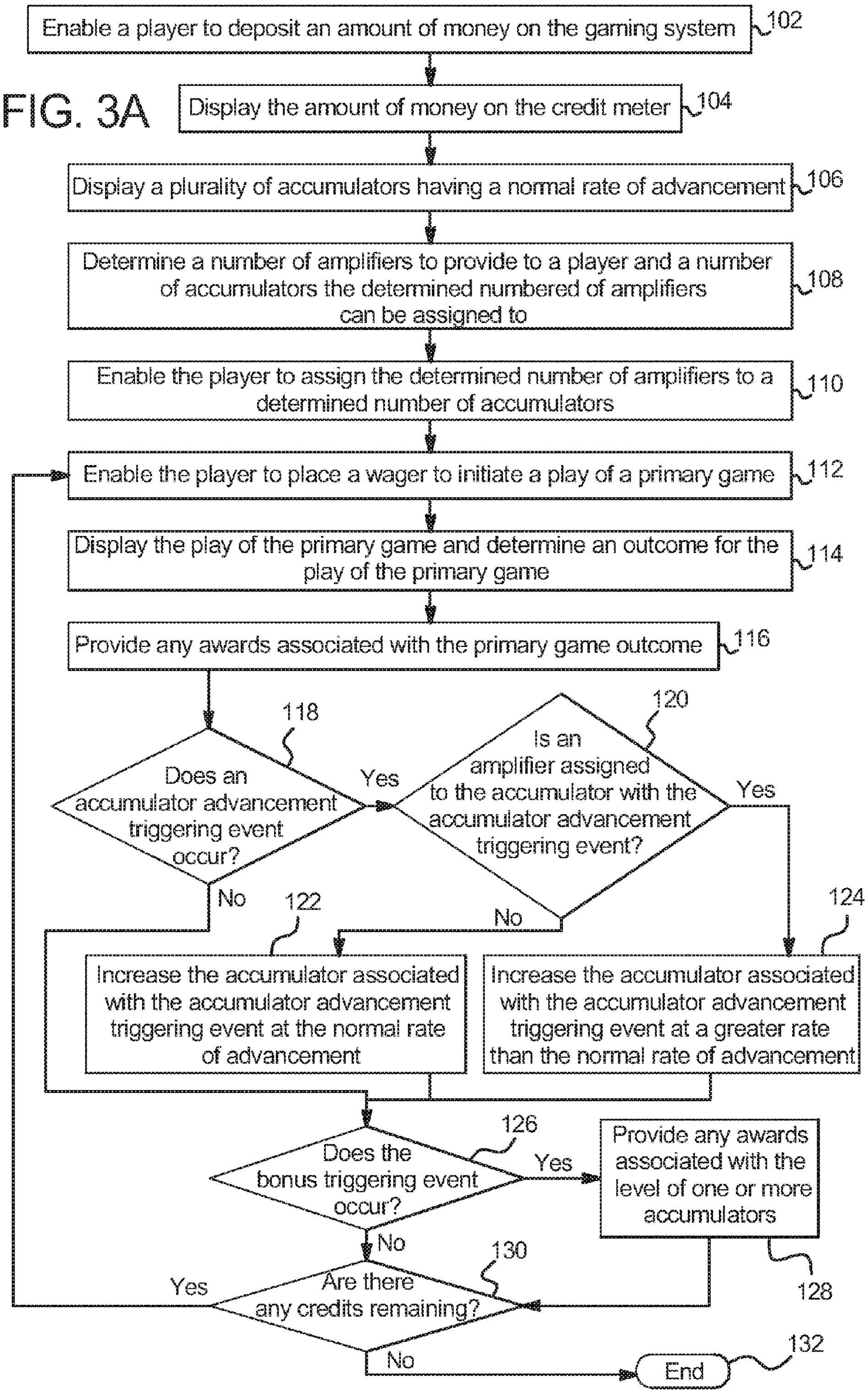
FIG. 3A is a flowchart of one embodiment of the gaming system disclosed herein, illustrating an example in which the assigned amplifier causes the accumulator to increase at a rate of advancement greater than a normal rate of advancement if an accumulator triggering event occurs.

FIG. 3A illustrates one embodiment of the method of the present disclosure which enables players to assign a designated number of amplifiers to a designated number of accumulators. When an amplifier is assigned to one of the accumulators, the rate of advancement of that accumulator is increased because the accumulator increases at a greater rate than the normal rate of advancement associated with that accumulator if an accumulator advancement triggering event occurs for that accumulator. When a bonus triggering event occurs, the gaming system provides any awards associated with the level of one or more of the accumulators to the player.

More specifically, the gaming system enables a player to deposit an amount of money on the gaming system as indicated by block 102. After a player deposits funds into the gaming system, the gaming system determines the amount of funds inserted and displays that amount on a credit meter or other suitable display as indicated by block 104.

The gaming system displays a plurality of accumulators having a normal rate of advancement as indicated by block 106. A plurality of the accumulators are each associated with a total value, level, strength and/or points. For each accumulator, when an accumulator advancement triggering event occurs for that accumulator, the value or points associated with that accumulator advances or increases.

As indicated by block 108, the gaming system determines a number or quantity of amplifiers or accelerators to provide to the player and a number of accumulators the determined numbered of amplifiers can be assigned to. After the gaming provides any amplifiers, the gaming system enables the player to assign the determined number of the amplifiers to the determined number of accumulators as indicated by block 110. In one embodiment, the gaming system displays an indication to the player of which accumulators are assigned with amplifiers. In one embodiment, a plurality of accumulators are each associated with a normal rate of advancement. As will be explained below, each assigned amplifier causes an increase in the normal rate of advancement for any accumulator assigned with an amplifier.

In this embodiment, after the player assigns the determined number of amplifiers, the gaming system enables the player to place a wager using a portion of the deposited funds to initiate a play of the primary game as indicated by block 112. After the player makes a wager to initiate a play of the primary game, the gaming system displays the play of the primary game and determines an outcome for the play of the primary game as indicated by block 114. The gaming system provides any awards associated with the primary game play as indicated by block 116. The gaming system updates the credit meter to reflect any credits won by the player in the primary game.

As indicated by decision diamond 118, after the gaming system displays the outcome of the primary game, the gaming system determines whether an accumulator advancement triggering event has occurred.

If the gaming system determines that an accumulator advancement triggering event has occurred, the gaming system determines whether an amplifier is assigned to the accumulator associated with the accumulator advancement triggering event, as indicated by decision diamond 120.

If an amplifier is assigned to the accumulator associated with the accumulator advancement triggering event, the gaming system increases the accumulator associated with the accumulator advancement triggering event at a greater rate than the normal rate associated for that accumulator, as indicated by block 124. If an amplifier is not assigned to the accumulator associated with the accumulator advancement triggering event, the gaming system increases the accumulator associated with the accumulator advancement triggering event at the normal rate associated for that accumulator, as indicated by block 122.

After the gaming system increases the accumulator associated with the accumulator advancement triggering event, or if the gaming system determines that an accumulator advancement triggering event has not occurred, the gaming system determines whether a bonus triggering event has occurred as indicated by decision diamond 126. If the gaming system determines that the bonus triggering event occurred, the gaming system provides the awards associated with the level of the one or more accumulators as indicated by block 128.

If the gaming system determines that the bonus triggering event has not occurred, the gaming system determines whether the player has any credits remaining as indicated by decision diamond 130. If there are credits remaining, the gaming system repeats the process starting at block 112. The player, therefore, has the opportunity to place another wager to initiate another play of the primary game. If there are no credits remaining, the process ends as indicated by oval 132.

Figure 3B:
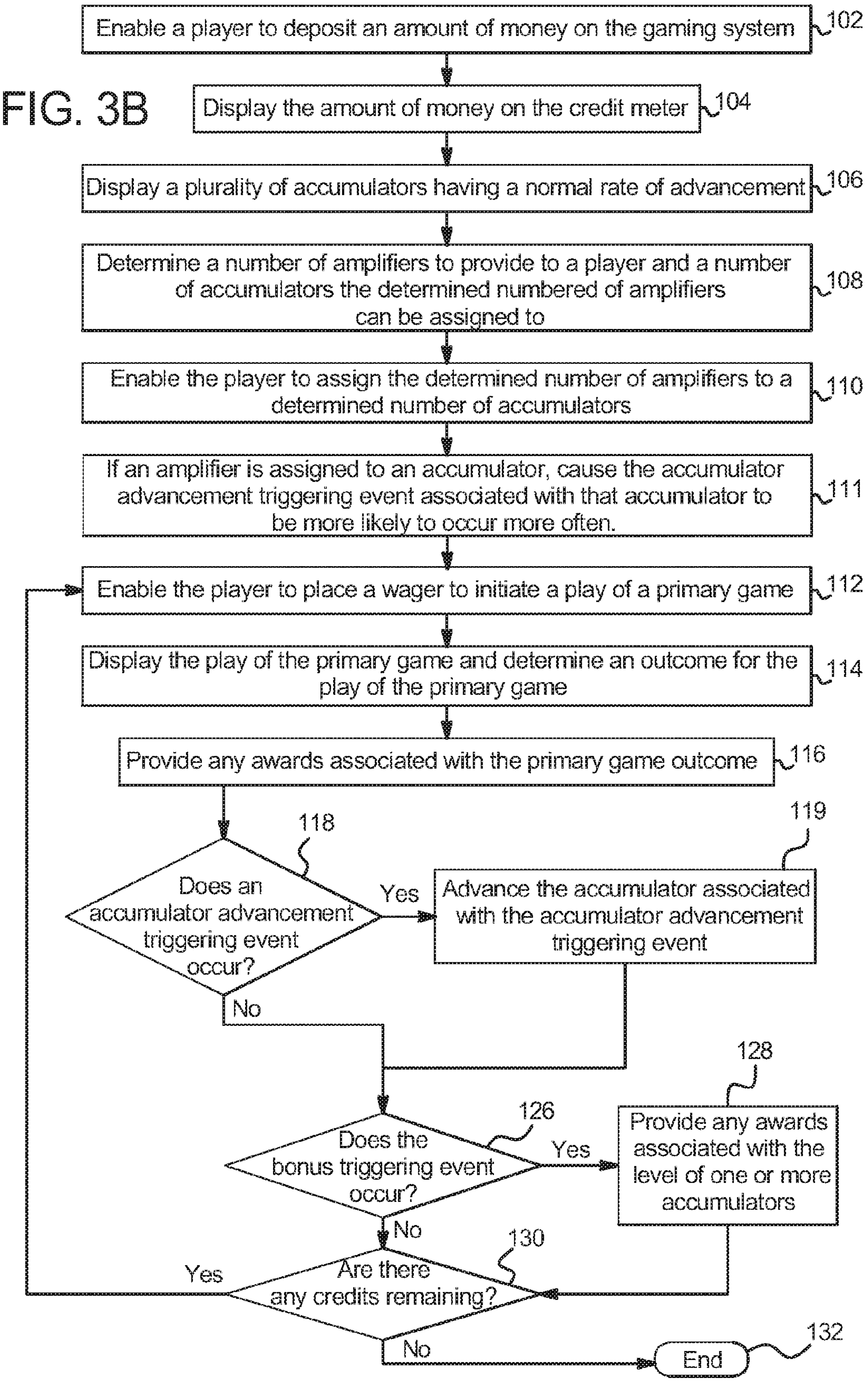
FIG. 3B is a flowchart of another embodiment of the gaming system disclosed herein, illustrating an example in which the assigned amplifier causes an accumulator advancement triggering event to be more likely to occur more often.

FIG. 3B illustrates another embodiment of the method of the present disclosure wherein the assignment of an amplifier to an accumulator causes the rate of advancement to increase because the accumulator advancement triggering event for that accumulator is more likely to occur more often, as indicated by block 111. In one example embodiment, the accumulator advancement triggering event is more likely to occur more often because the gaming system increases the probability of generating a symbol that is associated with an accumulator advancement triggering event. In one embodiment, the accumulator advancement triggering event is more likely to occur more often because the assignment of an amplifier to an accumulator causes the gaming system to reduce a number of symbols which are required to cause the accumulator advancement triggering event to occur. When a bonus triggering event occurs, the gaming system provides any awards associated with the level of one or more of the accumulators to the player.

As indicated by decision diamond 118, after the gaming system displays the outcome of the primary game, the gaming system determines whether an accumulator advancement triggering event has occurred.

If the gaming system determines that an accumulator advancement triggering event has occurred, the gaming system advances the accumulator associated with the accumulator advancement triggering event, as indicated by block 119. After the gaming system advances the accumulator associated with the accumulator advancement triggering event, or if the gaming system determines that an accumulator advancement triggering event has not occurred, the gaming system determines whether a bonus triggering event has occurred as indicated by decision diamond 126.

Referring to FIGS. 4A to 4K, this example embodiment generally shows an example illustrating an assigned amplifier causing the rate of advancement to increase because the accumulator assigned with the amplifier increases at a greater rate than the normal rate of advancement when an accumulator advancement triggering event occurs for that accumulator. In this embodiment, when the bonus triggering event occurs, the gaming system provides the player with an award of ten bonus game free spins. Moreover, when the bonus triggering event occurs, the gaming system provides the player with different awards that are associated with a respective accumulator. In this example, the gaming system enables the player to apply a provided award associated with an accumulator in the bonus game free spins.

Figure 4A:
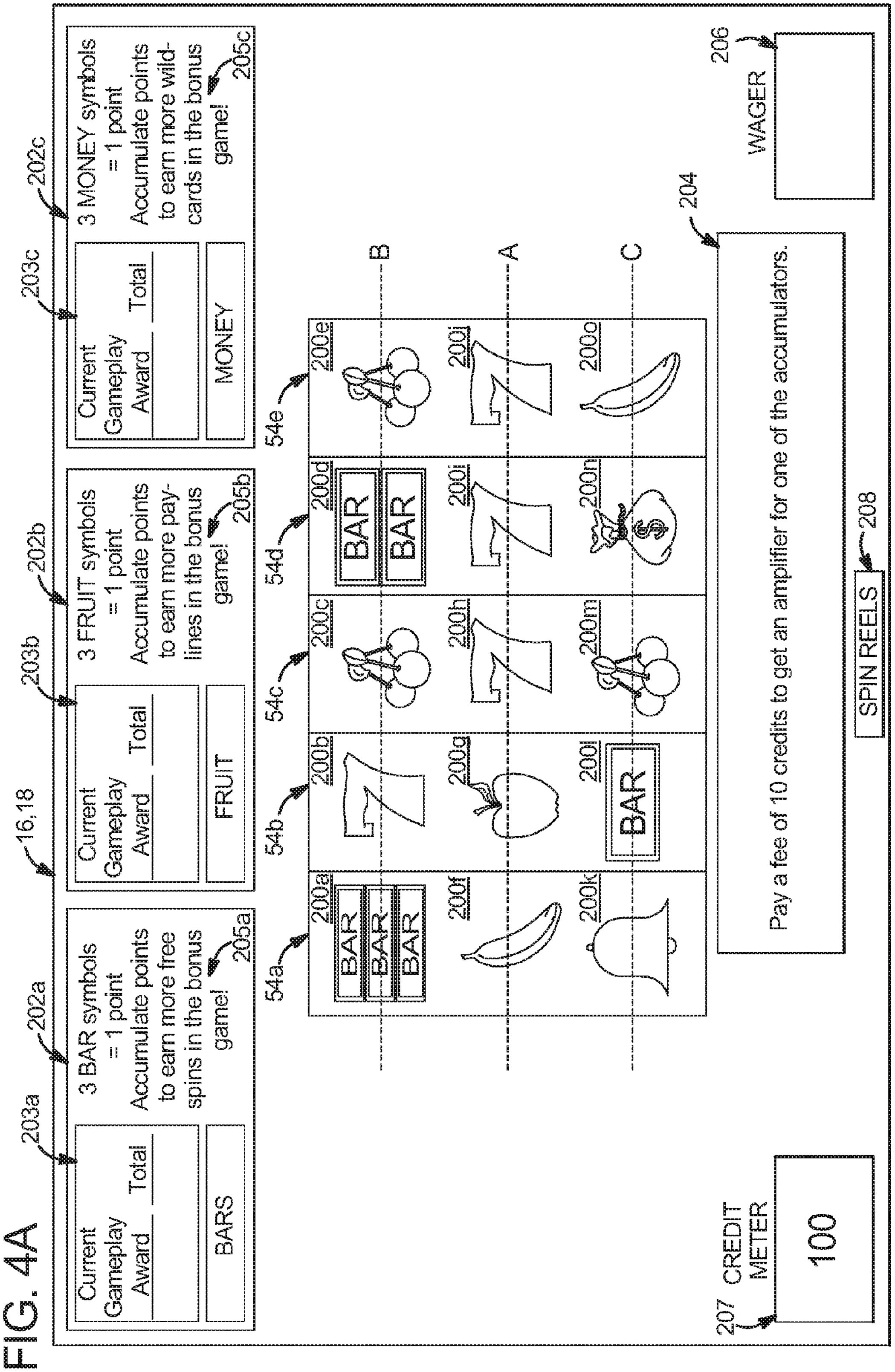

As illustrated in FIG. 4A, the display device 16 or 18 displays a primary game, and more particularly a slot game, which includes a plurality of reels 54*a*, 54*b*, 54*c*, 54*d*, and 54*e*. In this example, the reels include a plurality of symbols 200*a* to 200*o*.

The display device 16 or 18 also includes a credit meter 207. The credit meter 207 displays how much money has been deposited by the player and how many credits or other types of awards are provided for the playing of the game. The credit meter 207 shows the number 100, indicating that the player has deposited money into the gaming system to play the game.

The display device 16 or 18 displays a plurality of accumulators. That is, the display device displays a bar symbol accumulator 202*a*, a fruit symbol accumulator 202*b* and a money symbol accumulator 202*c*. In this example, each of the accumulators include an accumulator point meter 203 which displays the total value or points associated with that accumulator. Each accumulator point meter also displays the amount of points won for that accumulator for the current game play. The bar symbol accumulator 202*a* includes an accumulator point meter 203*a*. The accumulator point meter 203*a* displays the current game play award associated with the bar symbol accumulator 202*a* and the total amount of points accumulated for the bar symbol accumulator 202*a*. The fruit symbol accumulator 202*b* includes an accumulator point meter 203*b*. The accumulator point meter 203*b* displays the current game play award associated with the fruit symbol accumulator 202*b* and the total amount of points accumulated for the fruit symbol accumulator 202*b*. The money symbol accumulator 202*c* includes an accumulator point meter 203*c*. The accumulator point meter 203*c* displays the current game play award associated with the money symbol accumulator 202*c* and the total amount of points accumulated for the money symbol accumulator 202*c*.

In this example embodiment, each of the accumulators are associated with different awards. The bar symbol accumulator 202*a* is associated with an award of extra free spins of the bonus game, as indicated in the accumulator message display 205*a*. The fruit symbol accumulator 202*b* is associated with an award of extra paylines, as indicated in the accumulator message display 205*b*. The money symbol accumulator 202*c* is associated with an award of extra wild symbols, as indicated in the accumulator message display 205*c*.

In this embodiment, each accumulator 202*a*, 202*b* and 202*c* is associated with a different accumulator advancement triggering event. The triggering event for each of the accumulators 200*a*, 200*b* and 200*c* is based on different primary game symbol outcomes. More specifically, if the gaming system 10 generates three bar symbols, the bar symbol accumulator 202*a* advances; if the gaming system generates three fruit symbols, the fruit symbol accumulator 202*b* advances; and if the gaming system generates three money symbols, the money symbol accumulator 202*c* advances.

In this embodiment, each symbol accumulator 200*a*, 200*b* and 200*c* is associated with a normal rate of advancement. More specifically, the normal rate of advancement associated with the bar symbol accumulator 202*a* is to advance one point if the gaming system generates three bar symbols as indicated by the accumulator message display 205*a*. The normal rate of advancement associated with the fruit symbol accumulator 202*b* is to advance one point if the gaming system generates three fruit symbols as indicated by the accumulator message display 205*b*. The normal rate of advancement associated with the money symbol accumulator 202*c* is to advance one point if the gaming system generates three money symbols as indicated by the accumulator message display 205*c*.

Figure 4B:
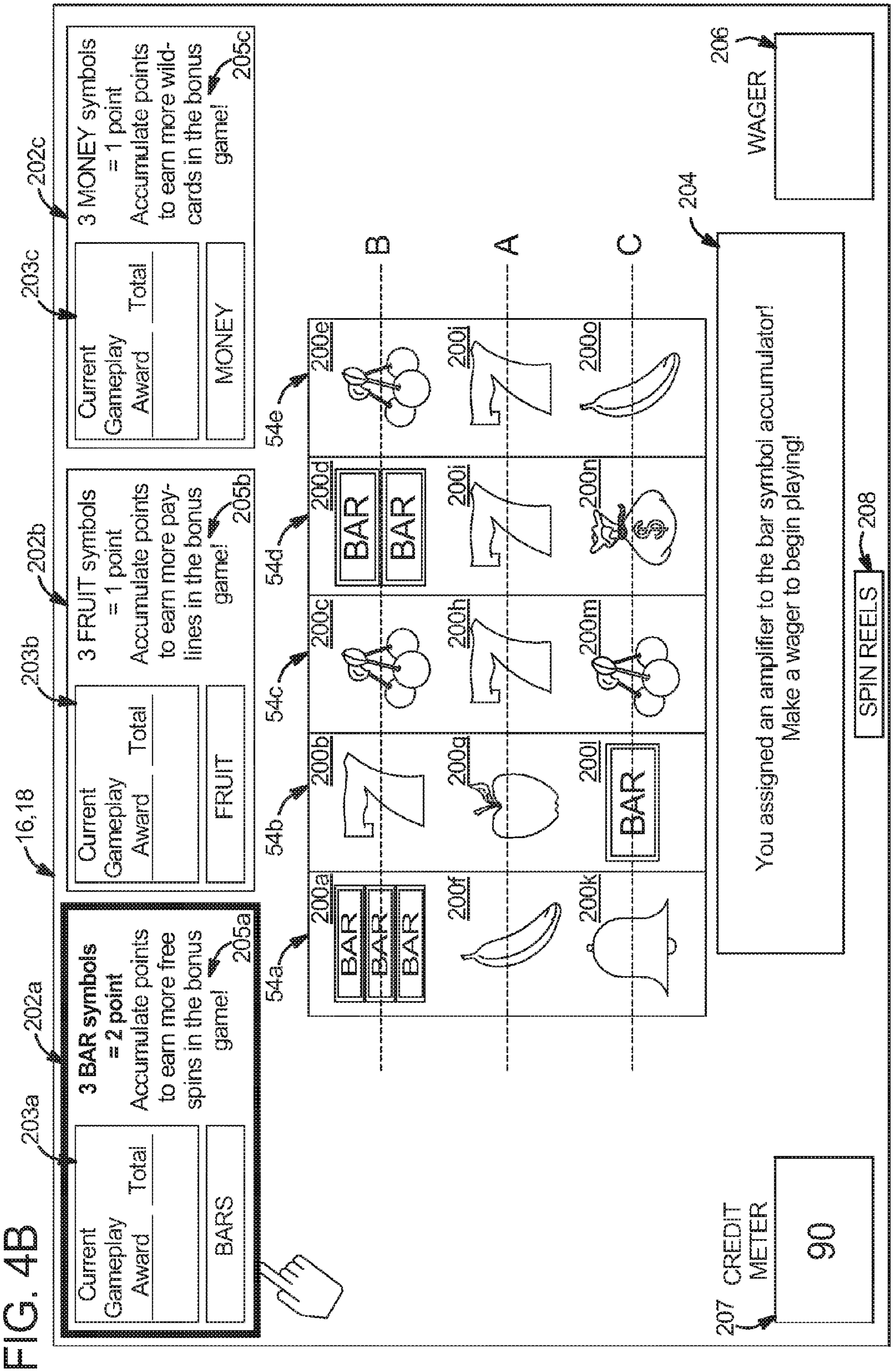

In this embodiment, the display device 16 or 18 displays an audio, visual, or audiovisual message 204 informing the player that the player can pay a fee of ten credits to buy an amplifier to assign to one of the accumulators. As shown in FIG. 4B, the credit meter shows the number 90, indicating that the player has chosen to purchase an amplifier. The player assigns the amplifier to the bar symbol accumulator 202*a*, as shown in FIG. 4B. In this example embodiment, the gaming system displays an indication (i.e., the highlighted border) to the player which indicates that the bar symbol accumulator 202*a* has been assigned with the purchased amplifier.

The assigned amplifier, in this example, causes the bar symbol accumulator 202*a* to increase at a greater rate than the normal rate of advancement associated with the bar symbol accumulator 202*a*. As stated above, the normal rate of advancement for the bar symbol accumulator is to advance one point for each generation of three bar symbols. In FIG. 4B, the player assigned an amplifier to the bar symbol accumulator 202*a* and thus the new rate of advancement for the bar symbol accumulator 202*a* is now to advance two points for each generation of three bar symbols, as indicated by the accumulator message display 205*a*. An appropriate message such as "YOU ASSIGNED AN AMPLIFIER TO THE BAR SYMBOL ACCUMULATOR! MAKE A WAGER TO BEGIN PLAYING!" is provided to the player visually, such as in the message display 204, or through suitable audio or audiovisual displays.

Figure 4C:
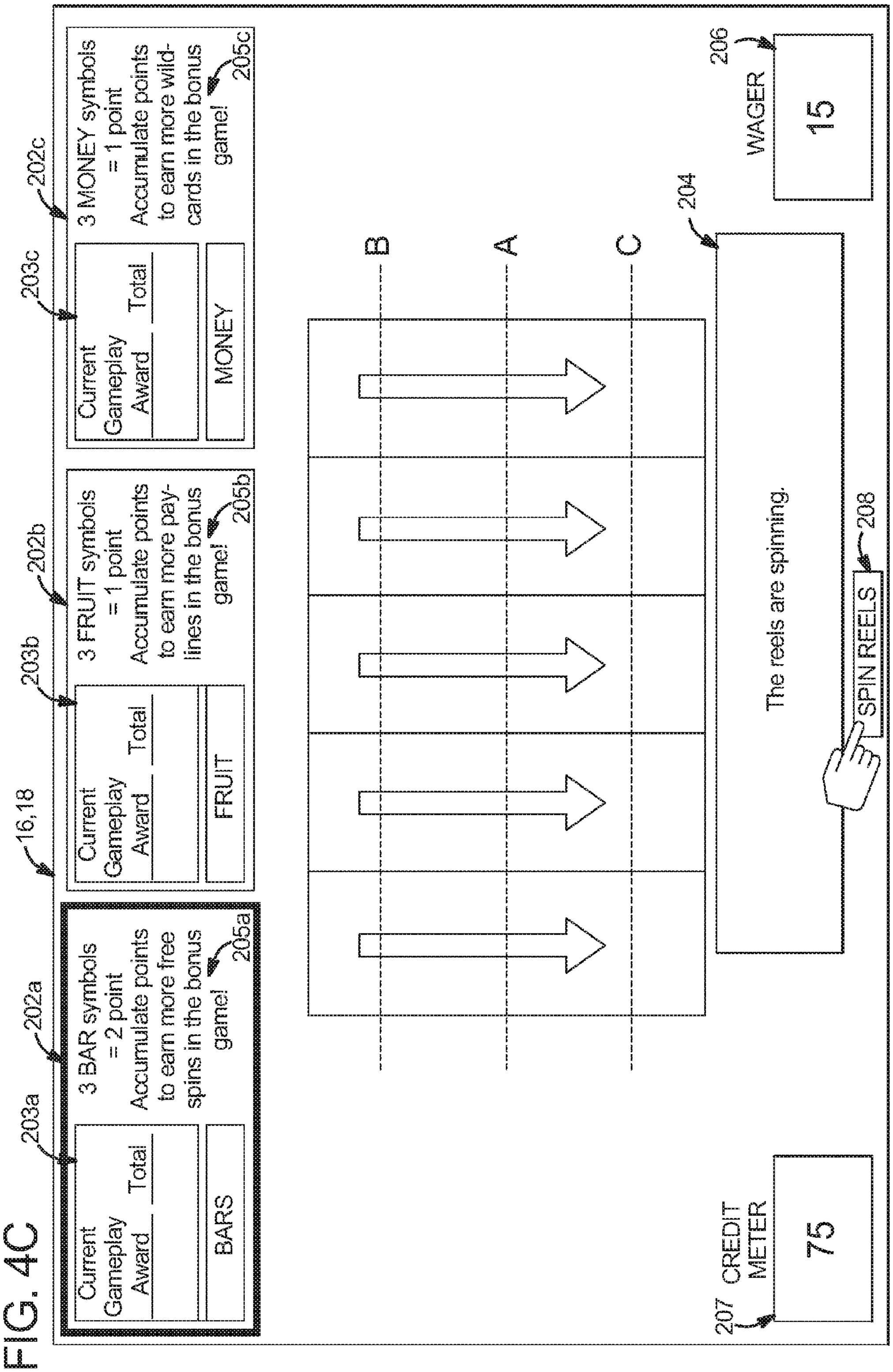
Figure 4D:
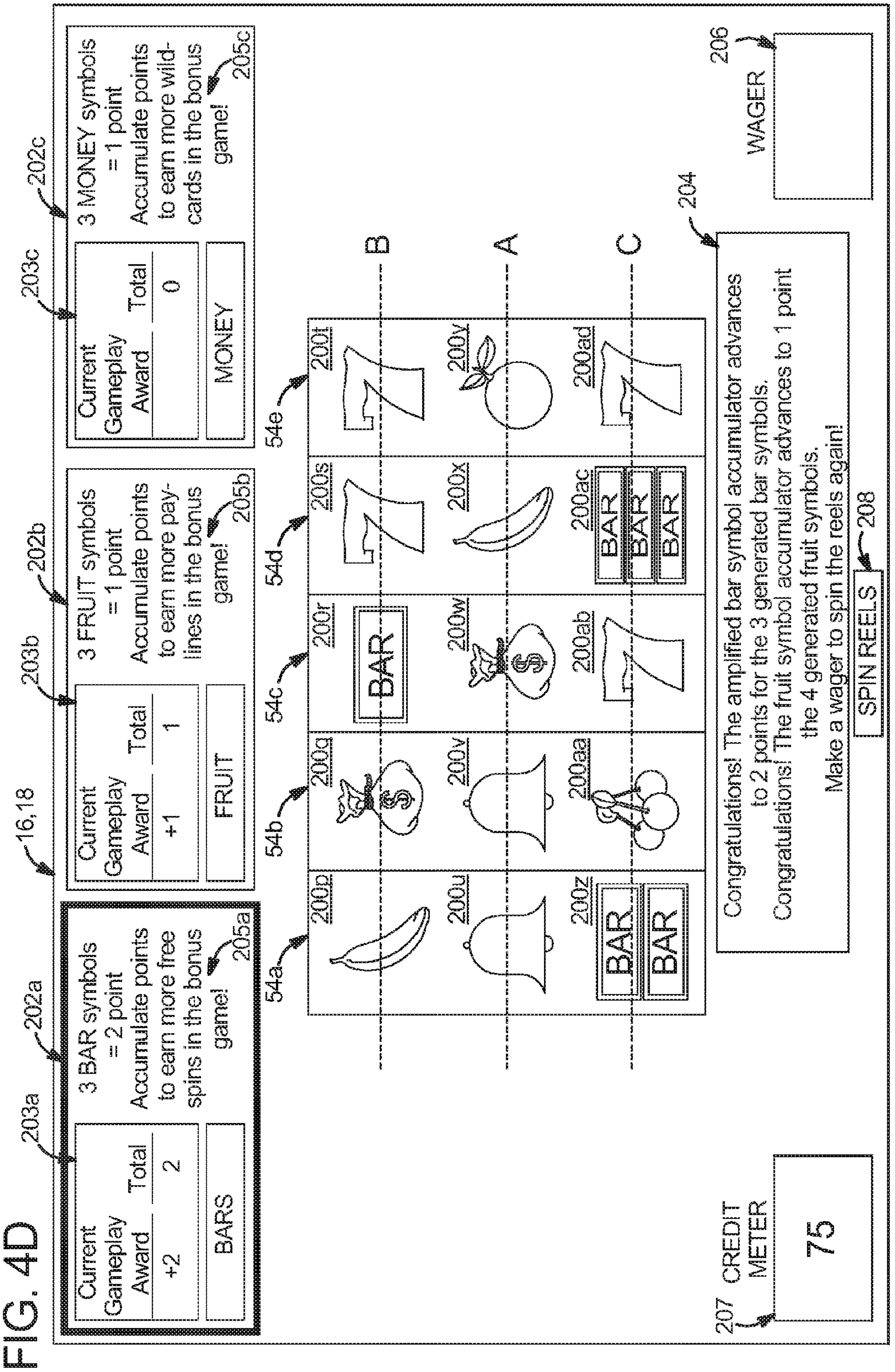

As illustrated in FIG. 4C, the player pushes the spin reels button 208 to place the wager to initiate a play of the primary game. When the player pushes the spin reels button 208, the number of credits shown in the credit meter 207 decreases by fifteen (i.e., the amount of credits wagered), and the number of credits shown in the wager meter 206 increases by fifteen. Accordingly, the wager meter 206 displays the number fifteen, and the credit meter 207 displays the player's remaining credits after using fifteen of the credits to make the wager. That is, the credit meter 207 shows the number seventy-five to reflect the player's remaining credits. It should be appreciated that the fifteen credits wagered is the sum of the player's wager on each of the paylines A, B and C. That is, in this example, the player wagered five credits on each of the paylines A, B and C. Upon receiving the player's wager, the gaming system causes the reels 54*a*, 54*b*, 54*c*, 54*d*, and 54*e* to spin, as seen in FIG. 4C. In FIG. 4D, display device 16 or 18 displays the reels 54*a*, 54*b*, 54*c*, 54*d*, and 54*e* after they have stopped spinning. The reels 54*a*, 54*b*, 54*c*, 54*d*, and 54*e* indicate a combination of symbols on the paylines.

As illustrated in FIG. 4D, the bar symbol accumulator 202*a* and the fruit symbol accumulator 202*b* each advance. The bar symbol accumulator 202*a* advances two points because the gaming system generated three bar symbols (i.e., 200*r*, 200*z*, and 200*ac*), as indicated by the accumulator point meter 203*a*. The fruit symbol accumulator 202*b* advances one point because the gaming system generated four fruit symbols (i.e., 200*p*, 200*x*, 200*y*, and 200*aa*). It should be appreciated that in this example, the player is not provided with a primary game award because the gaming system did not generate and display a predetermined primary winning symbol combination. An appropriate message such as "CONGRATULATIONS! THE AMPLIFIED BAR SYMBOL ACCUMULATOR ADVANCES TO 2 POINTS FOR THE 3 GENERATED BAR SYMBOLS. CONGRATULATIONS! THE FRUIT ACCUMULATOR ADVANCES TO 1 POINT FOR THE 4 GENERATED FRUIT SYMBOLS. MAKE A WAGER TO SPIN THE REELS AGAIN!" is provided to the player visually, such as in the message display 204, or through suitable audio or audiovisual displays.

Figure 4E:
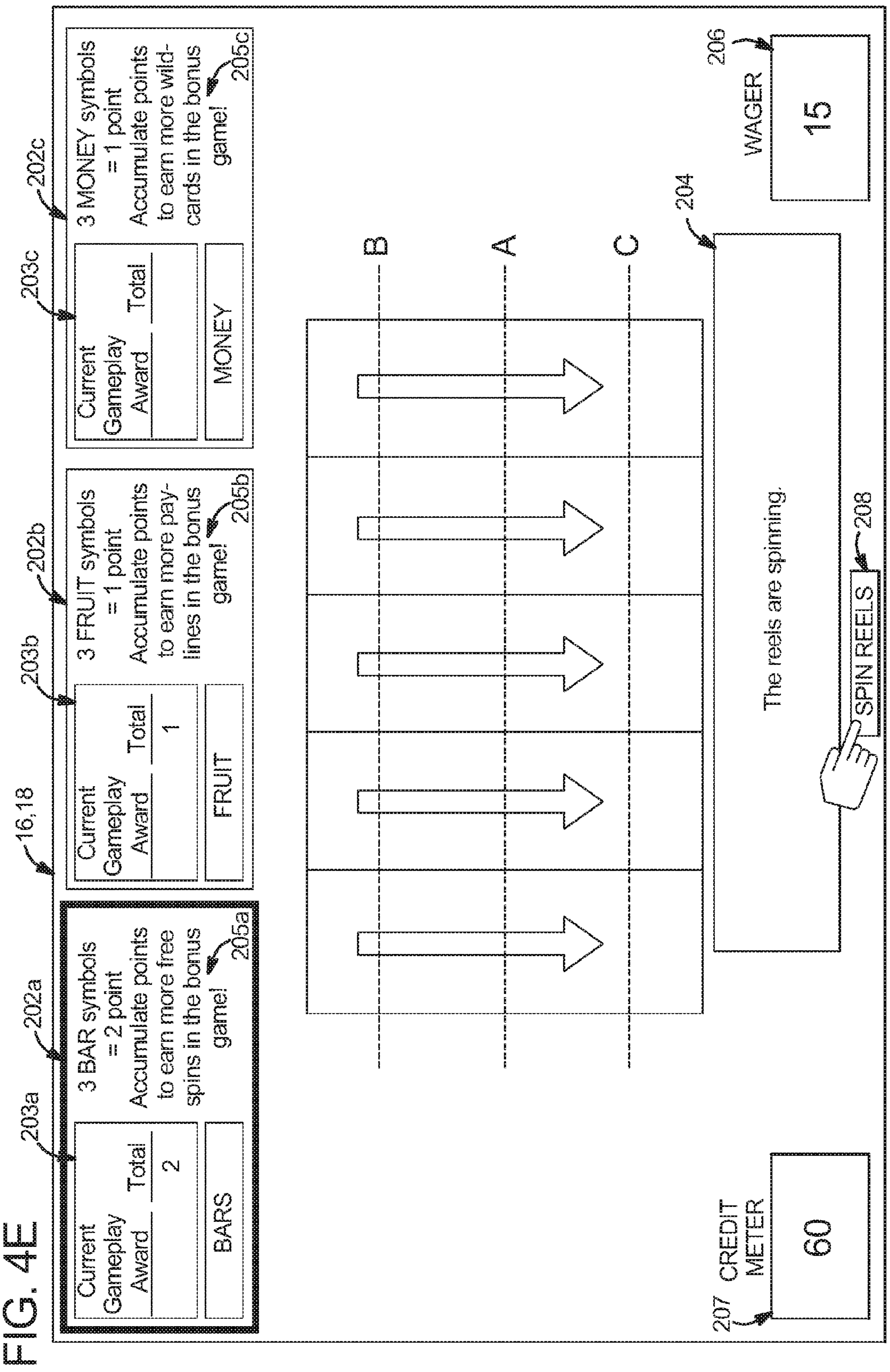

As illustrated in FIG. 4E, the player pushes the spin reels button 208 to place the wager to initiate a play of the primary game. Accordingly, the wager meter 206 displays the number fifteen, and the credit meter 202 displays the player's remaining credits after using fifteen of the credits to make the wager. That is, the credit meter 202 shows the number sixty to reflect the player's remaining credits. Upon receiving the player's wager, the gaming system causes the reels 54*a*, 54*b*, 54*c*, 54*d*, and 54*e* to spin, as seen in FIG. 4E.

Figure 4F:
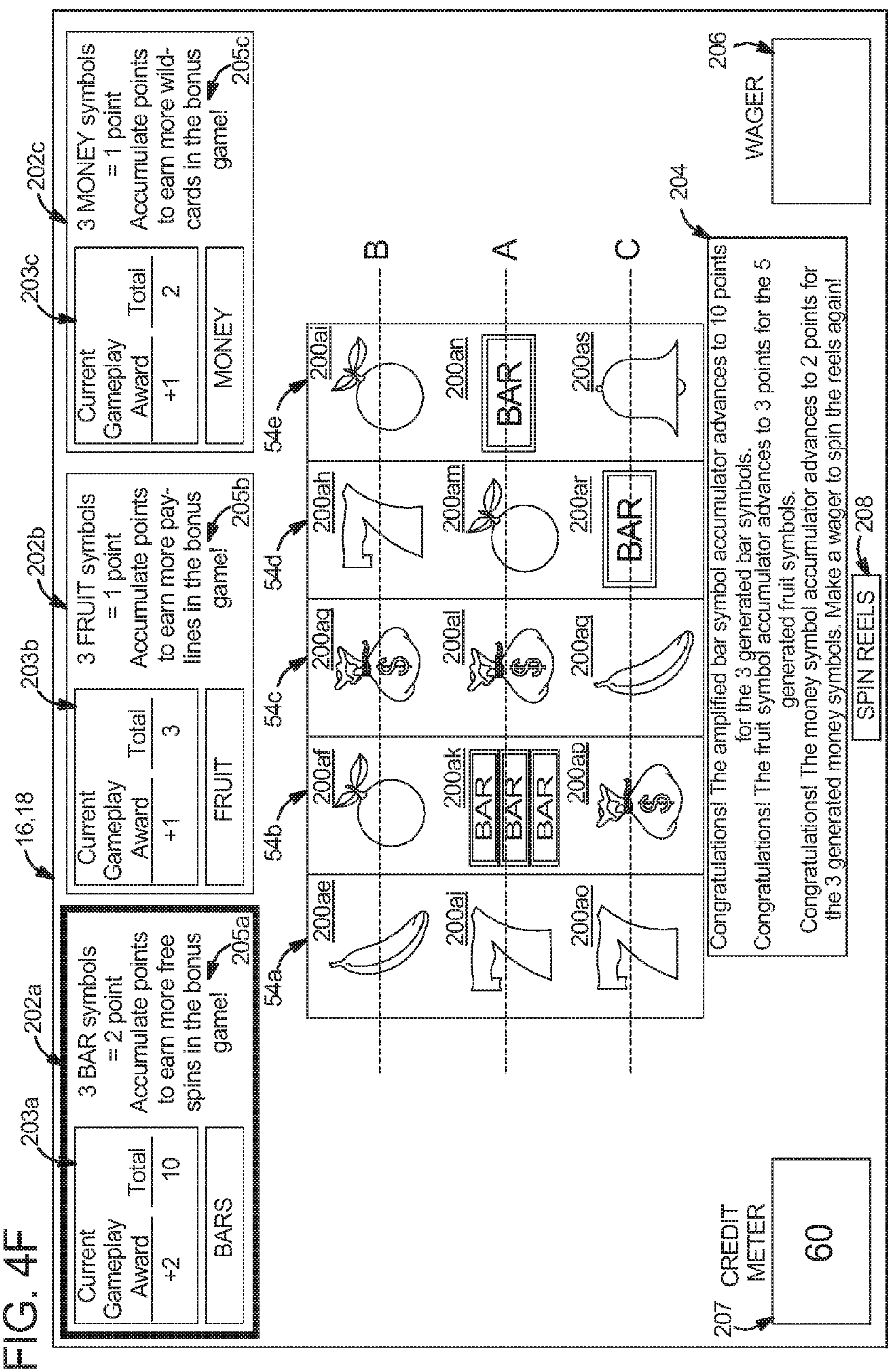

FIG. 4F illustrates a subsequent game play in which the player had previously accumulated (i.e., before the current game play illustrated in FIG. 4F) six points for the bar symbol accumulator 202*a*, one point for the fruit symbol accumulator 202*b*, and one point for the money symbol accumulator 202*c*.

As illustrated in FIG. 4F, the reels 54*a* to 54*e* display a combination of symbols after the reels have stopped spinning. It should be appreciated that in this example, the player is not provided with a primary game award because the gaming system did not generate and display a predetermined primary winning symbol combination.

In FIG. 4F, the bar symbol accumulator 202*a*, the fruit symbol accumulator 202*b* and the money symbol accumulator 202*c* each advance because of the occurrence of each of the accumulator advancement triggering events associated with each of the accumulators. That is, the bar symbol accumulator 202*a* advances two points, as illustrated by the accumulator point meter 203*a*, because the gaming system generated three bar symbols (i.e., 200*ak*, 200*an*, and 200*ar*). The fruit symbol accumulator 202*b* advances one point, as illustrated by the accumulator point meter 203*b*, because the gaming system generated four fruit symbols (i.e., 200*ae*, 200*ai*, 200*am*, and 200*aq*). The money symbol accumulator 202*c* advances one point, as illustrated by the accumulator meter 203*c*, because the gaming system generated three money symbols (i.e., 200*ag*, 200*al*, and 200*ap*). An appropriate message such as "CONGRATULATIONS! THE AMPLIFIED BAR SYMBOL ACCUMULATOR ADVANCES TO 10 POINTS FOR THE 3 GENERATED BAR SYMBOLS. CONGRATULATIONS! THE FRUIT SYMBOL ACCUMULATOR ADVANCES TO 3 POINTS FOR THE 5 GENERATED FRUIT SYMBOLS. CONGRATULATIONS! THE MONEY SYMBOL ACCUMULATOR ADVANCES TO 2 POINTS FOR THE 3 GENERATED MONEY SYMBOLS. MAKE A WAGER TO SPIN THE REELS AGAIN!" is provided to the player visually, such as in the message display 204, or through suitable audio or audiovisual displays.

Figure 4G:
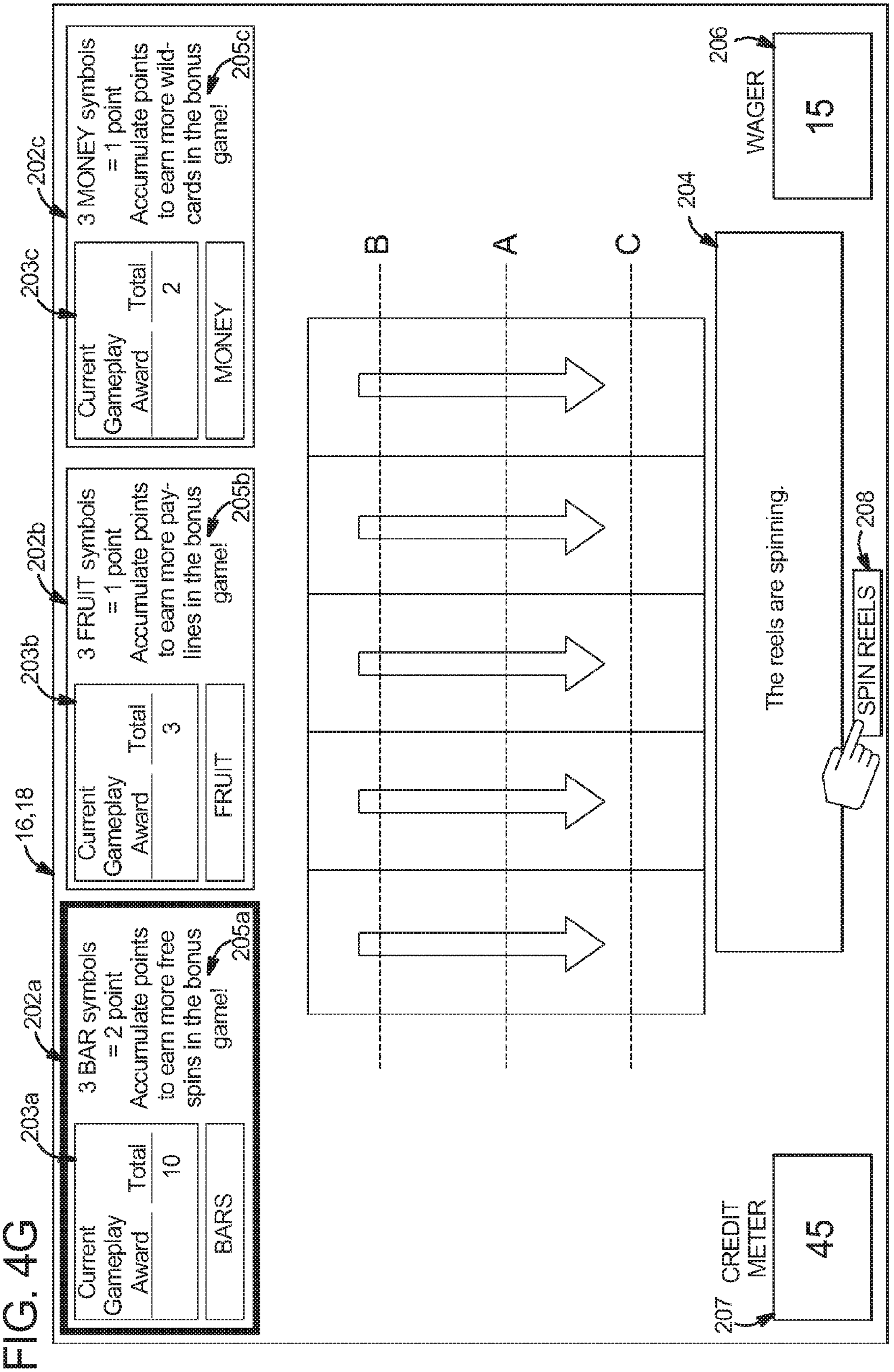
Figure 4H:
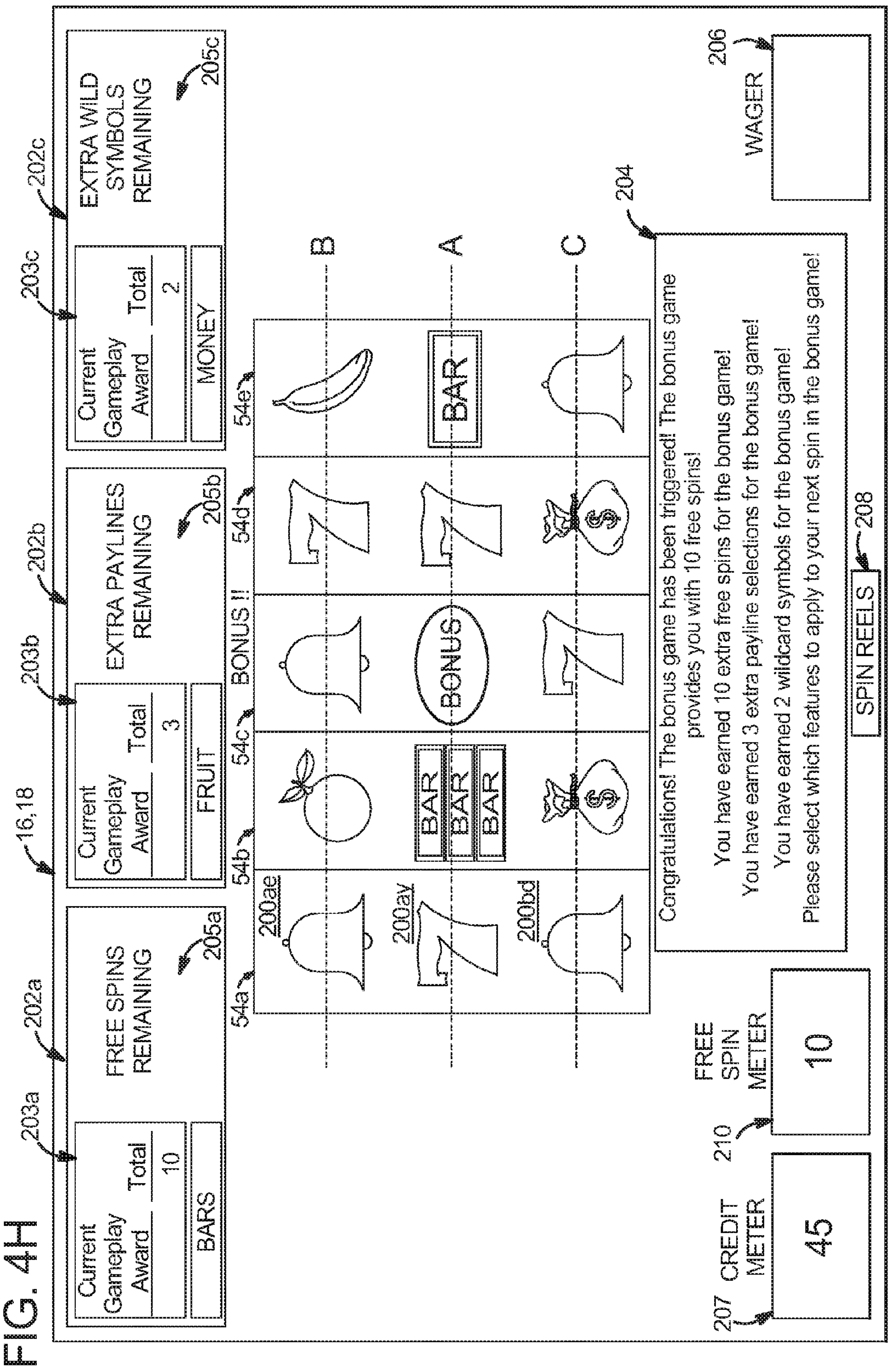

As illustrated in FIG. 4G, the player pushes the spin reels button 208 to place the wager to initiate a play of the primary game. Accordingly, the wager meter 206 displays the number fifteen, and the credit meter 207 displays the player's remaining credits after using fifteen of the credits to make the wager. That is, the credit meter 207 shows the number forty-five to reflect the player's remaining credits. Upon receiving the player's wager, the gaming system causes the reels 54*a*, 54*b*, 54*c*, 54*d*, and 54*e* to spin, as seen in FIG. 4G. In FIG. 4H, the reels 54*a* to 54*e* display a combination of symbols after the reels have stopped spinning.

In FIG. 4H, the generated symbols include a bonus triggering event (i.e., the generation of the "BONUS" symbol). The "BONUS" symbol on reel 54*c* triggers a bonus game of ten bonus game free spins as indicated by the message display 204. In this example, when the gaming system provides the bonus game, the display device provides a free spin meter 210. The free spin meter 210 displays how many bonus game free spins remain.

In this example, when the bonus triggering event occurs, the gaming system provides the awards associated with each accumulator to the player. The accumulators 203 display the amount of awards associated for each respective accumulator. As shown on the accumulator message display 205*a*, the player has earned an extra ten free spins for the bonus game. Thus, in this example, it should be appreciated that the player is awarded a total of twenty bonus game free spins (i.e., the ten bonus game free spins associated with the generated "BONUS" symbol and the ten extra free spins associated with the bar symbol accumulator 203*a*). The fruit symbol accumulator 202*b* provides the player with three extra paylines. The money symbol accumulator 202*c* provides the player with two extra wild symbols.

In this example, the player is enabled to apply one of the accumulated awards (i.e., the free spins, the paylines or the wild symbols) in a subsequent free spin bonus game. An appropriate message such as "CONGRATULATIONS! THE BONUS GAME HAS BEEN TRIGGERED! THE BONUS GAME PROVIDES YOU WITH 10 FREE SPINS! YOU HAVE EARNED 10 EXTRA FREE SPINS FOR THE BONUS GAME! YOU HAVE EARNED 3 EXTRA PAYLINE SELECTIONS FOR THE BONUS GAME! YOU HAVE EARNED 2 WILDCARD SYMBOLS FOR THE BONUS GAME! PLEASE SELECT WHICH FEATURES TO APPLY TO YOUR NEXT SPIN IN THE BONUS GAME!" is be provided to the player visually, such as in the message display 204, or through suitable audio or audiovisual displays.

Figure 4I:
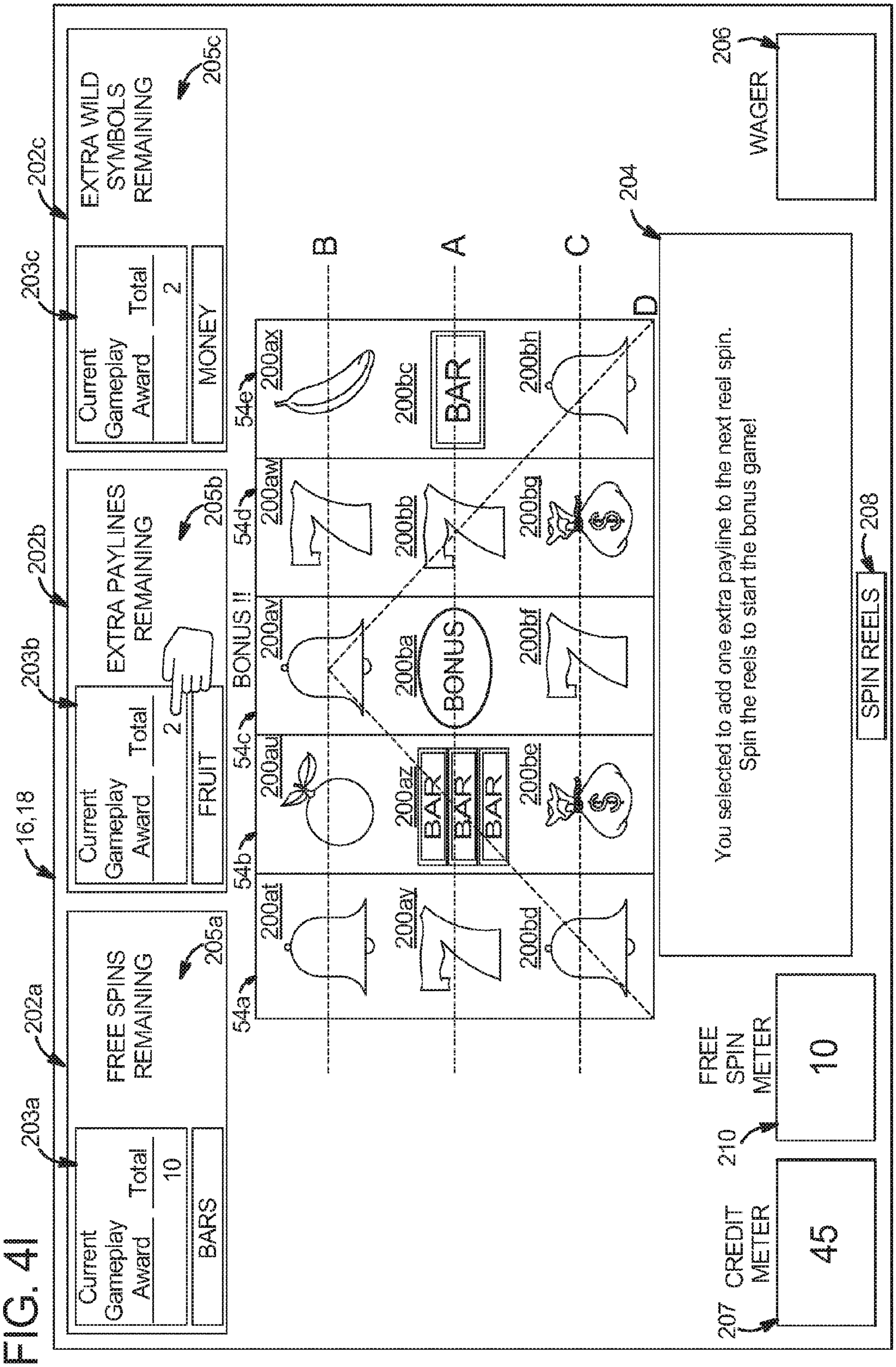

As shown in FIG. 4I, the player applies an extra payline for the subsequent free spin bonus game. The accumulator point meter shows the number two, indicating that the player selected an extra payline award to apply for subsequent spin of the bonus game. As illustrated in FIG. 4I, when the player selects an extra payline, the gaming system displays payline D.

Figure 4J:
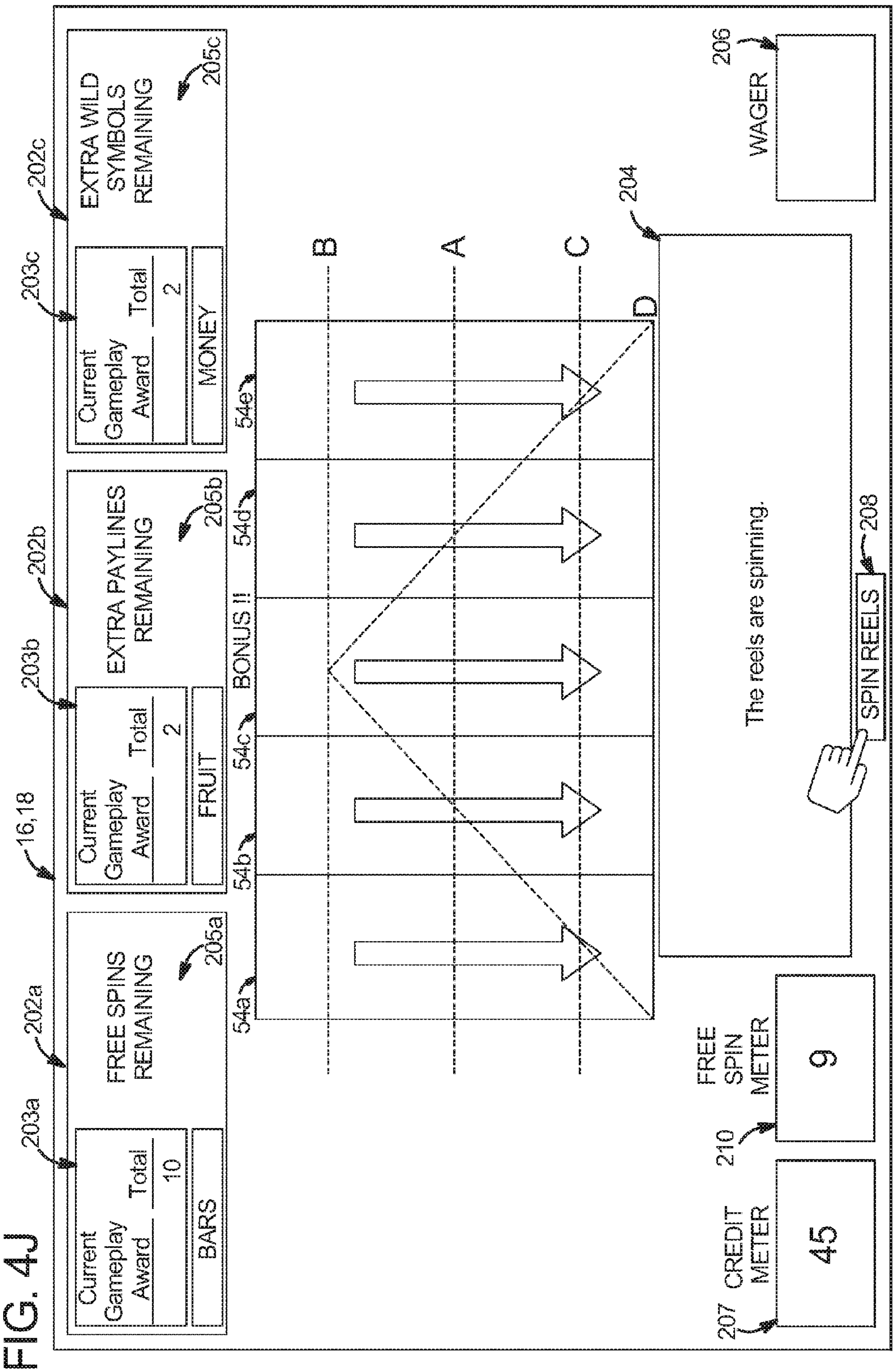
Figure 4K:
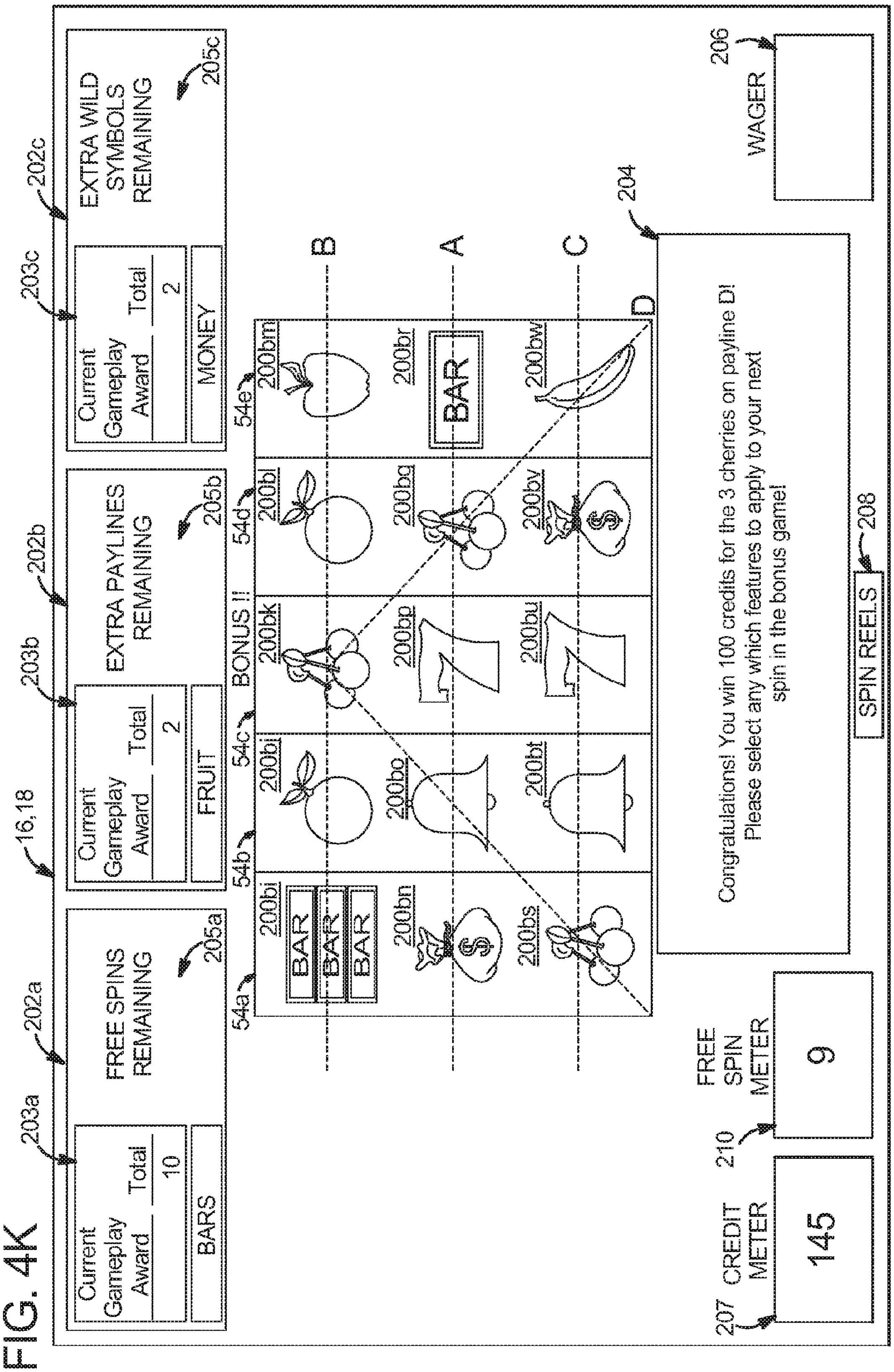

As illustrated in FIG. 4J, the player pushes the spin reels button 208 to place the wager to initiate a play of the bonus game. When the player pushes the spin reels button 208, the number of bonus game spins remaining shown in the free spin meter 210 decreases by one. Upon receiving the player's push, the gaming system causes the reels 54*a*, 54*b*, 54*c*, 54*d*, and 54*e* to spin, as seen in FIG. 4J. In FIG. 4K, display device 16 or 18 displays the reels 54*a*, 54*b*, 54*c*, 54*d*, and 54*e* after they have stopped spinning. The reels 54*a*, 54*b*, 54*c*, 54*d*, and 54*e* indicate a combination of symbols on the paylines.

As shown in FIG. 4K, the gaming system generates a winning symbol combination on payline D. More specifically, the combination of three cherries on payline D is the winning symbol combination. In this example, the gaming system provides the player with an award of 100 credits for the winning symbol combination. It should be appreciated that the gaming system would not have provided the player an award of 100 credits if the player would not have applied the extra payline D in the current bonus game free spin play.

Referring now to FIGS. 5A to 5H, this embodiment generally shows an example illustrating the assigned amplifier causing an increase in the rate of advancement because the accumulator advancement triggering event for that accumulator is more likely to occur more often. In this example, the accumulator triggering event is more likely to occur more often because the assigned amplifier causes a reduction in the amount of generated symbols needed to cause an accumulator advancement triggering event to occur. In this example, the bonus triggering event occurs when an accumulator reaches a designated level. When the bonus triggering event occurs, the gaming system provides the awards associated with the accumulator that reaches the designated level.

Figure 5A:
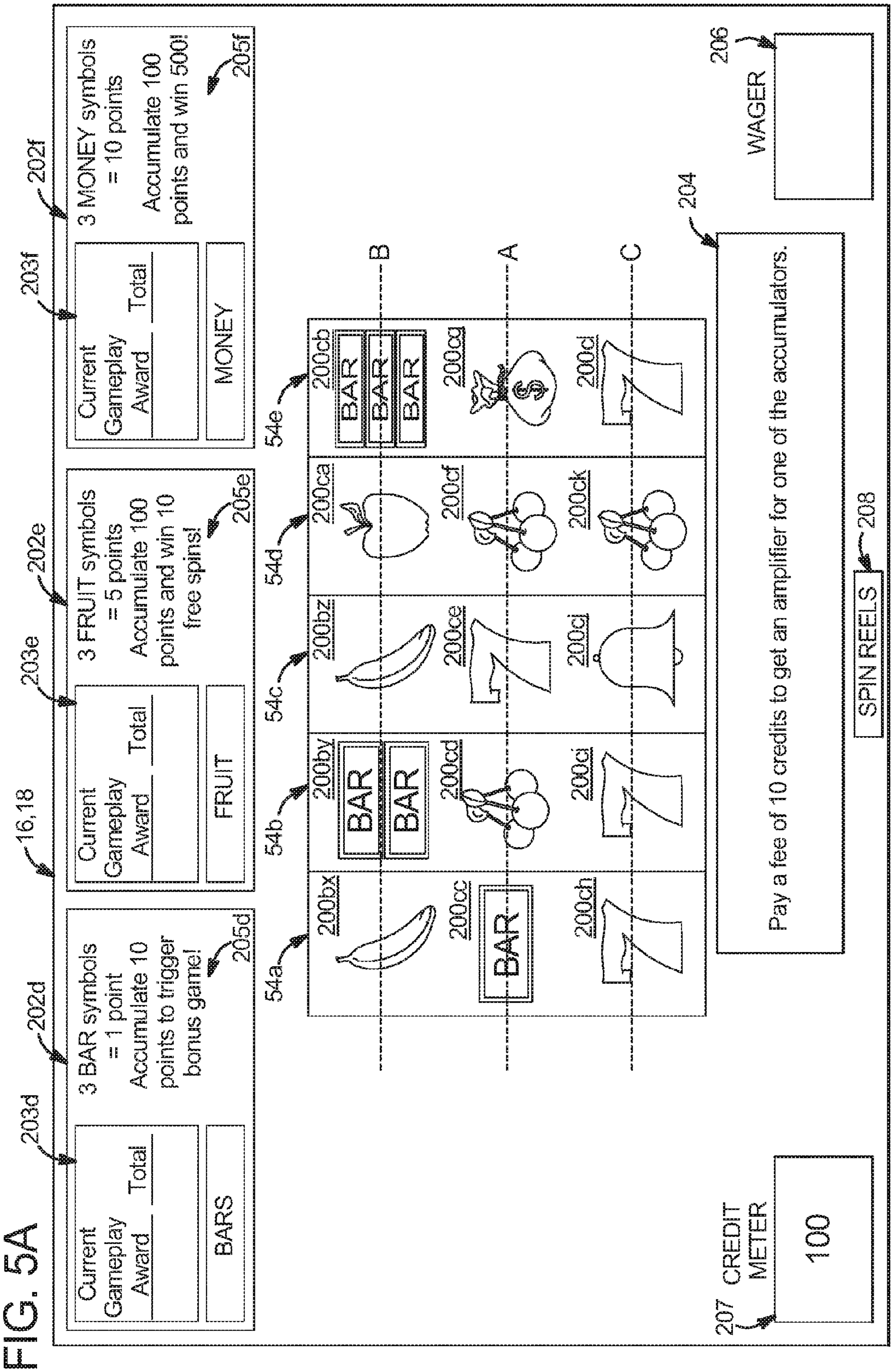
FIGS. 5A, 5B, 5C, 5D, 5E, 5F, 5G and 5H are front views of one embodiment of displays of the gaming system disclosed herein, illustrating the assigned amplifier causing the accumulator advancement triggering event for the accumulator to be more likely to occur more often.

In FIG. 5A, the display device 16 or 18 displays a plurality of accumulators. The display device displays a bar symbol accumulator 202*d*, a fruit symbol accumulator 202*e* and a money symbol accumulator 202*f*. Each accumulator provides a corresponding accumulator point meter 203.

In this example embodiment, each of the accumulators are associated with a different accumulator advancement triggering event. The accumulator advancement triggering event for each of the accumulators 200*d*, 200*e* and 200*f* is based on a different primary game symbol outcome. More specifically, the accumulator advancement triggering event for the bar symbol accumulator 200*d* occurs if the gaming system generates three bar symbols. The accumulator advancement triggering event for the fruit symbol accumulator 200*e* occurs if the gaming system generates three fruit symbols. The accumulator advancement triggering event for the money symbol accumulator 200*f* occurs if the gaming system generates three money symbols.

Figure 5B:
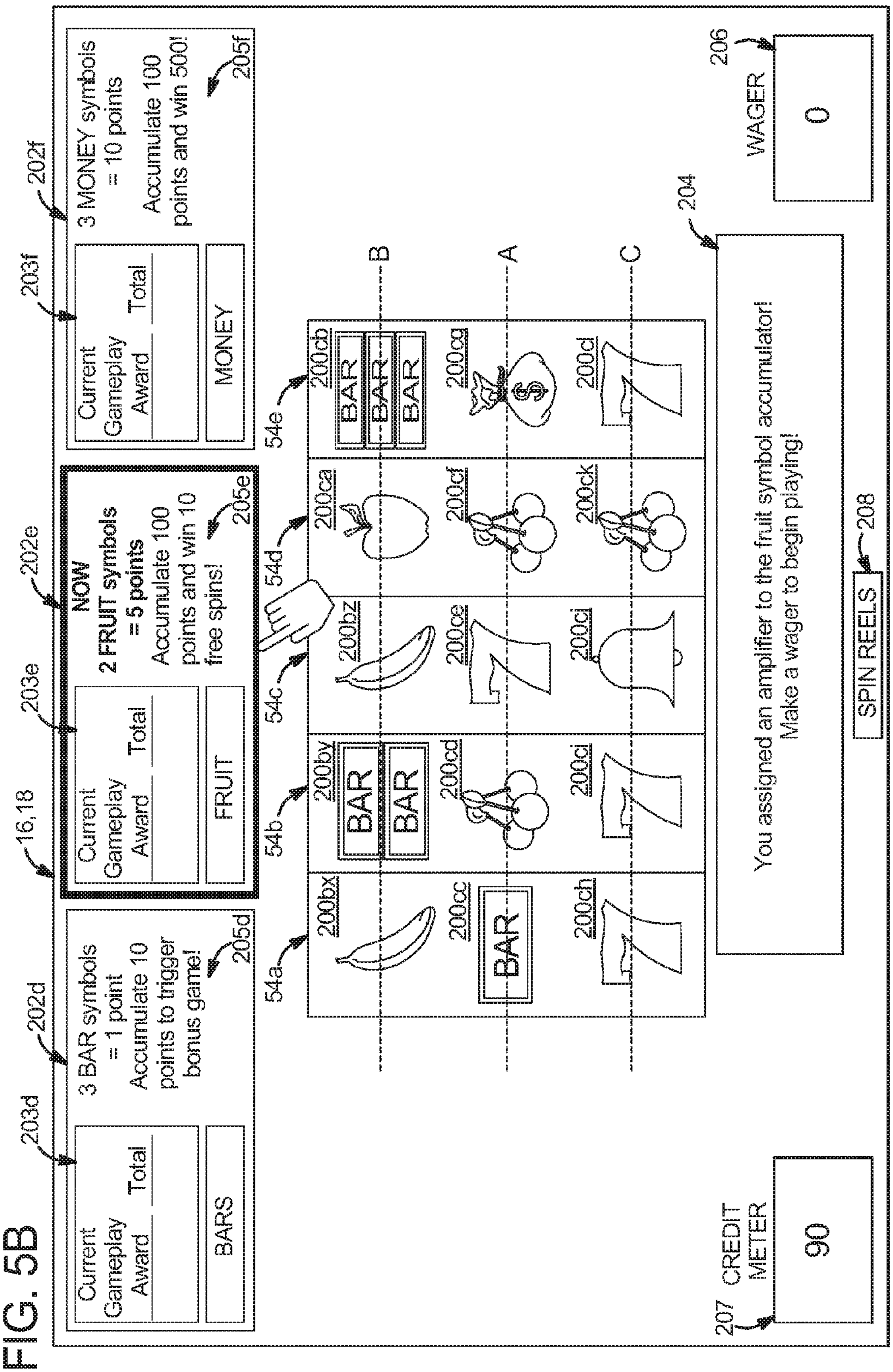

In this embodiment, the display device 16 or 18 displays an audio, visual, or audiovisual message 204 informing the player that the player can pay a fee of ten credits to buy an amplifier to assign to one of the accumulators. As shown in FIG. 5B, the credit meter shows the number ninety, indicating that the player has chosen to purchase an amplifier. In this example, the player assigned the amplifier to the fruit symbol accumulator 202*e*. The gaming system displays an indication (i.e., the highlighted border) to the player which indicates that the fruit symbol accumulator 202*e* has been assigned with the purchased amplifier.

The assigned amplifier, in this embodiment, causes the fruit symbol accumulator 200*e* to increase the rate of advancement of that accumulator because the accumulator advancement triggering event is more likely to occur more often for that accumulator. As stated above, the accumulator advancement triggering event for the fruit symbol accumulator 200*e* occurred when the gaming system generated three fruit symbols. Now, as shown in FIG. 5B, the player assigned an amplifier to the fruit symbol accumulator and therefore the new accumulator triggering event for fruit symbol accumulator occurs when the gaming system generates two fruit symbols, as indicated by the accumulator message display 205*e*. An appropriate message such as "YOU ASSIGNED AN AMPLIFIER TO THE FRUIT SYMBOL ACCUMULATOR! MAKE A WAGER TO BEGIN PLAYING!" is be provided to the player visually, such as in the message display 204, or through suitable audio or audiovisual displays.

Figure 5C:
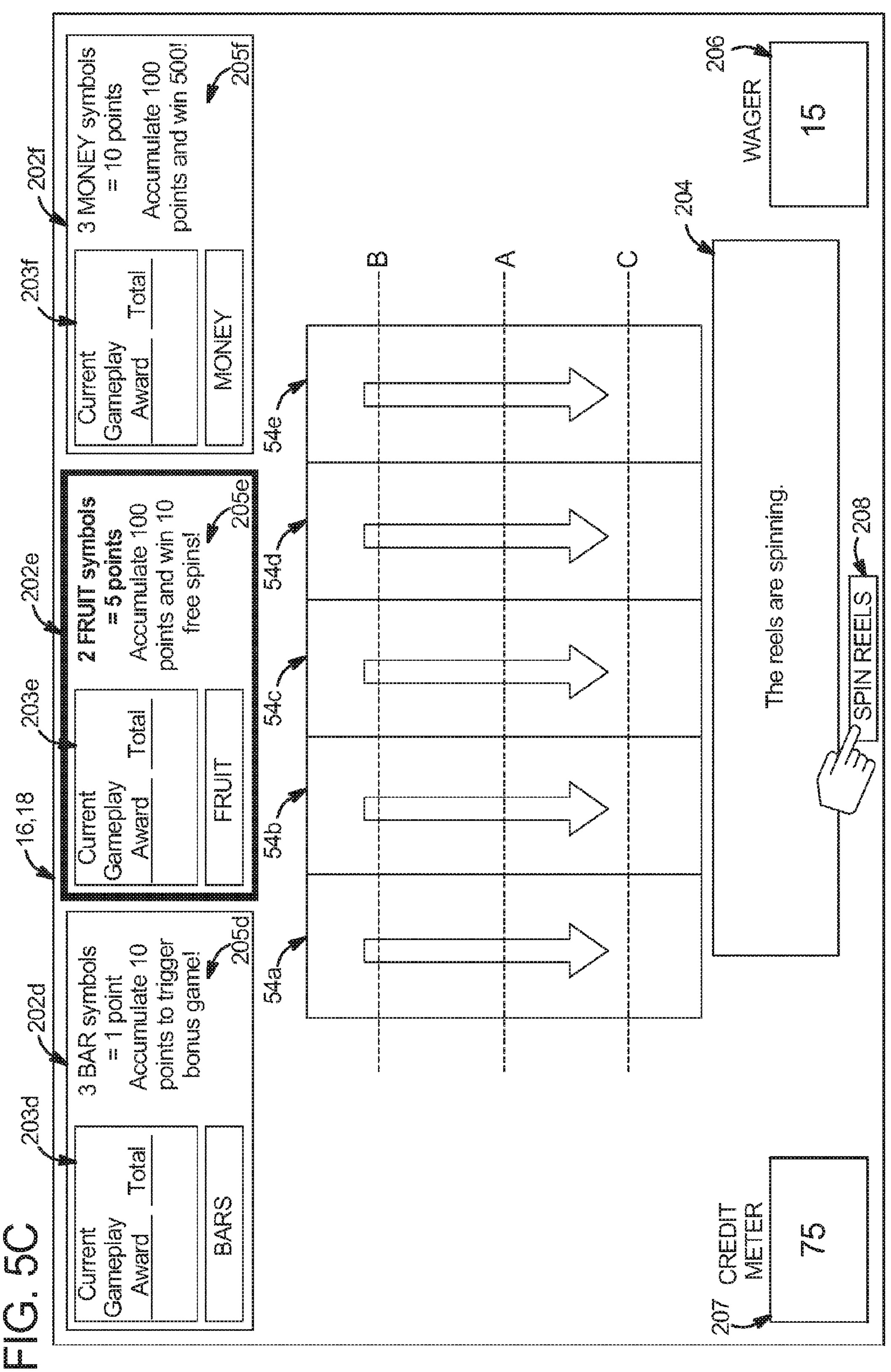
Figure 5D:
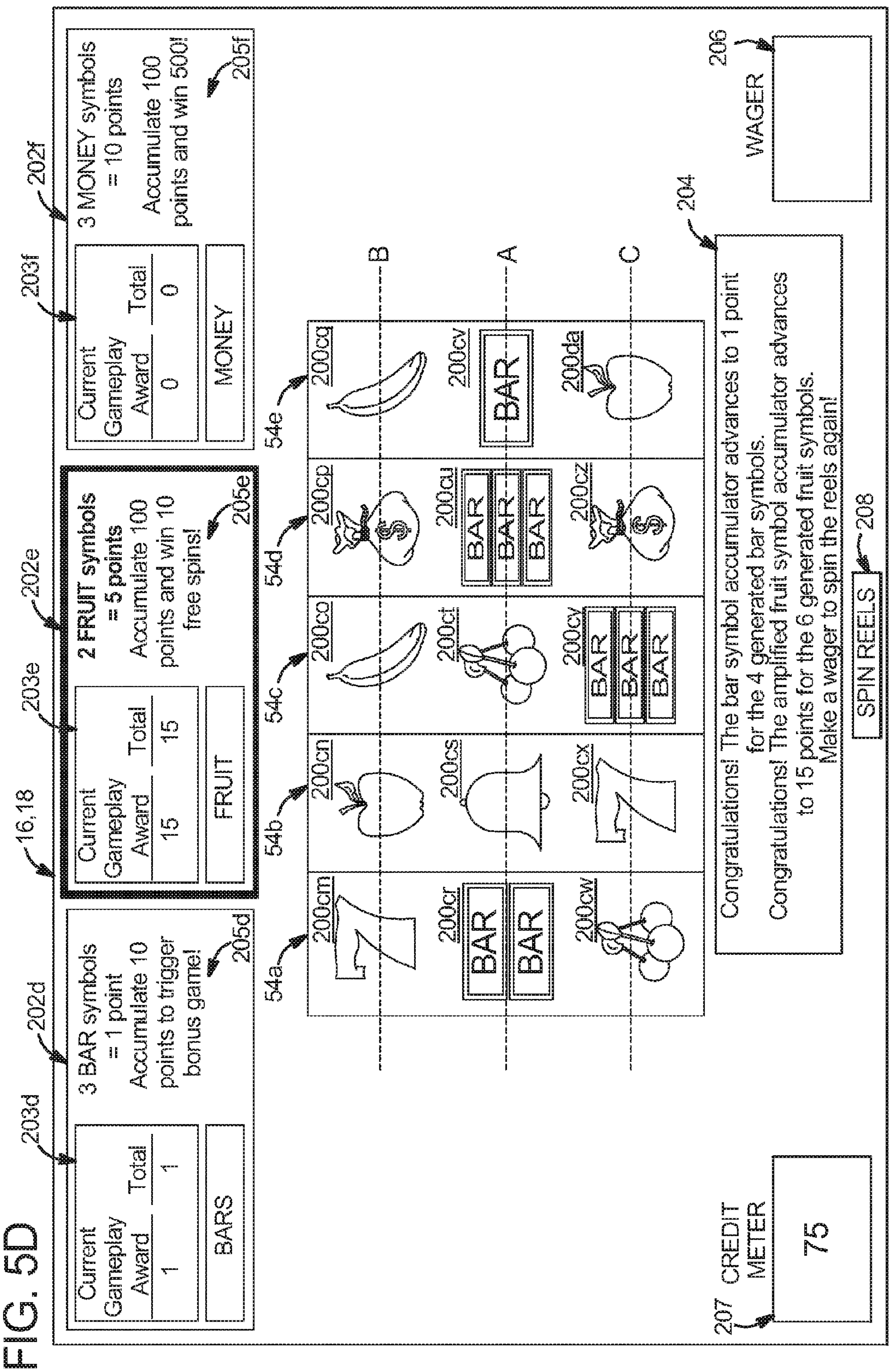

Referring to FIG. 5C, the player pushes the spin reels button 208 to place the wager to initiate a play of the primary game. When the player pushes the spin reels button 208, the number of credits shown in the credit meter 207 decreases by fifteen (i.e., the amount of credits wagered), and the number of credits shown in the wager meter 206 increases by fifteen. Accordingly, the wager meter 206 displays the number fifteen, and the credit meter 202 displays the player's remaining credits after using fifteen of the credits to make the wager. That is, the credit meter 202 shows the number seventy-five to reflect the player's remaining credits. It should be appreciated that the fifteen credit wager is the sum of the player's wager on each of the paylines A, B and C. That is, in this example, the player wagered five credits on each of the paylines A, B and C. Upon receiving the player's wager, the gaming system causes the reels 54*a*, 54*b*, 54*c*, 54*d*, and 54*e* to spin, as seen in FIG. 5C. In FIG. 5D, display device 16 or 18 displays the reels 54*a*, 54*b*, 54*c*, 54*d*, and 54*e* after they have stopped spinning. The reels 54*a*, 54*b*, 54*c*, 54*d*, and 54*e* indicate a combination of symbols on the paylines.

In FIG. 5D, the bar symbol accumulator 202*d* and the fruit symbol accumulator 202*e* each advance because each of the accumulator advancement triggering events associated with these accumulators occurred. More specifically, the bar symbol accumulator 202*d* advances one point, as illustrated by the accumulator point meter 203*d* because the gaming system generated three bar symbols (i.e., 200*cr*, 200*cv*, and 200*cy*). The fruit symbol accumulator advances fifteen points, as illustrated by the accumulator point meter 203 because the gaming system generated six fruit symbols (i.e., 200*cn*, 200*co*, 200*cq*, 200*ct*, 200*cw*, and 200*da*). It should be appreciated that in this example, the player is not provided with a primary game award because the gaming system did not generate and display a predetermined primary winning symbol combination. An appropriate message such as "CONGRATULATIONS! THE BAR SYMBOL ACCUMULATOR ADVANCES TO 1 POINT FOR THE 4 GENERATED BAR SYMBOLS. CONGRATULATIONS! THE AMPLIFIED FRUIT SYMBOL ACCUMULATOR ADVANCES TO 15 POINTS FOR THE 6 GENERATED FRUIT SYMBOLS. MAKE A WAGER TO SPIN THE REELS AGAIN!" is provided to the player visually, such as in the message display 204, or through suitable audio or audiovisual displays.

Figure 5E:
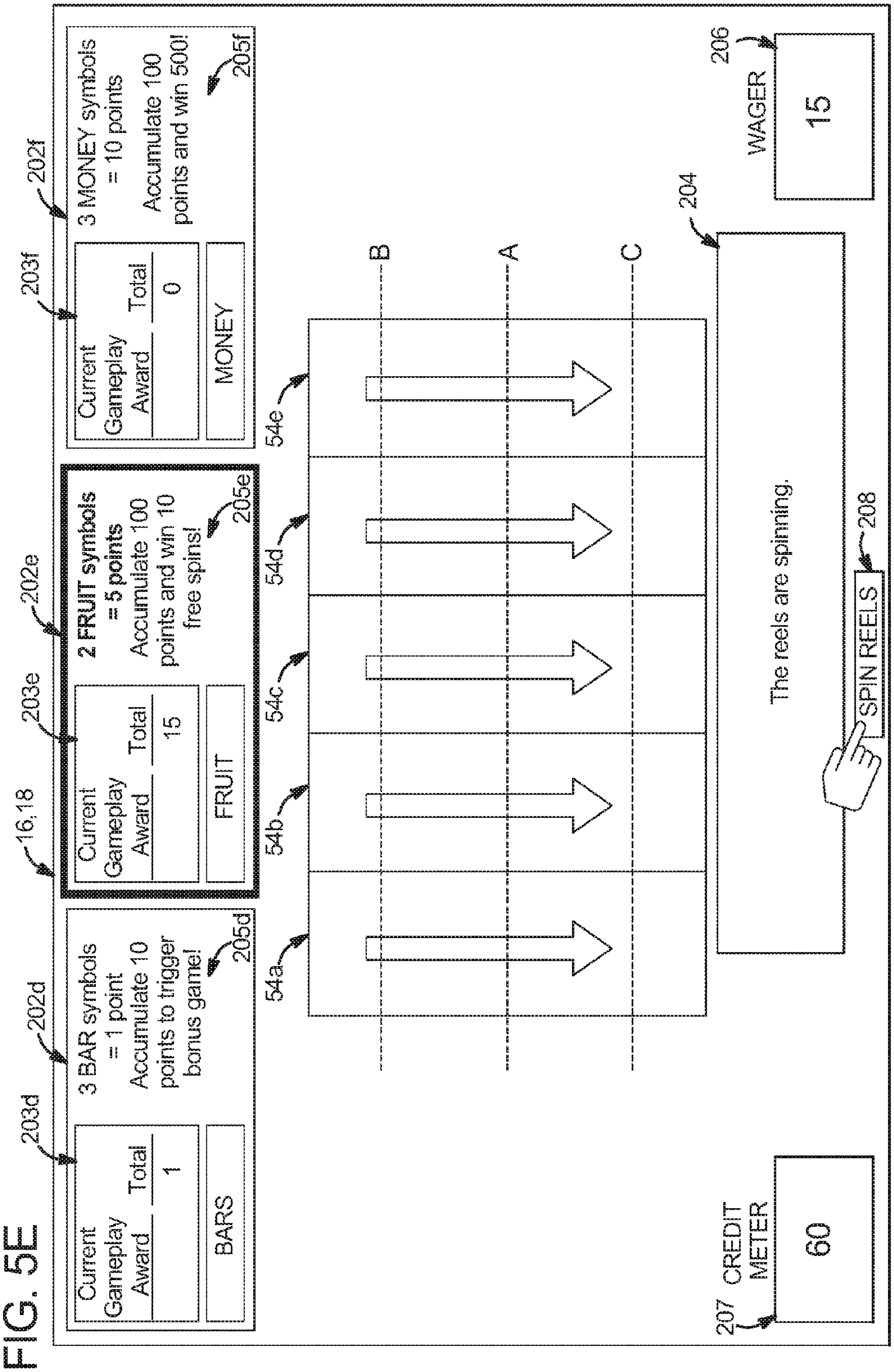

As illustrated in FIG. 5E, the player pushes the spin reels button 208 to place the wager to initiate a play of the primary game. Accordingly, the wager meter 206 displays the number fifteen, and the credit meter 207 displays the player's remaining credits after using fifteen of the credits to make the wager. That is, the credit meter 207 shows the number sixty to reflect the player's remaining credits. Upon receiving the player's wager, the gaming system causes the reels 54*a*, 54*b*, 54*c*, 54*d*, and 54*e* to spin as shown in FIG. 5E.

Figure 5F:
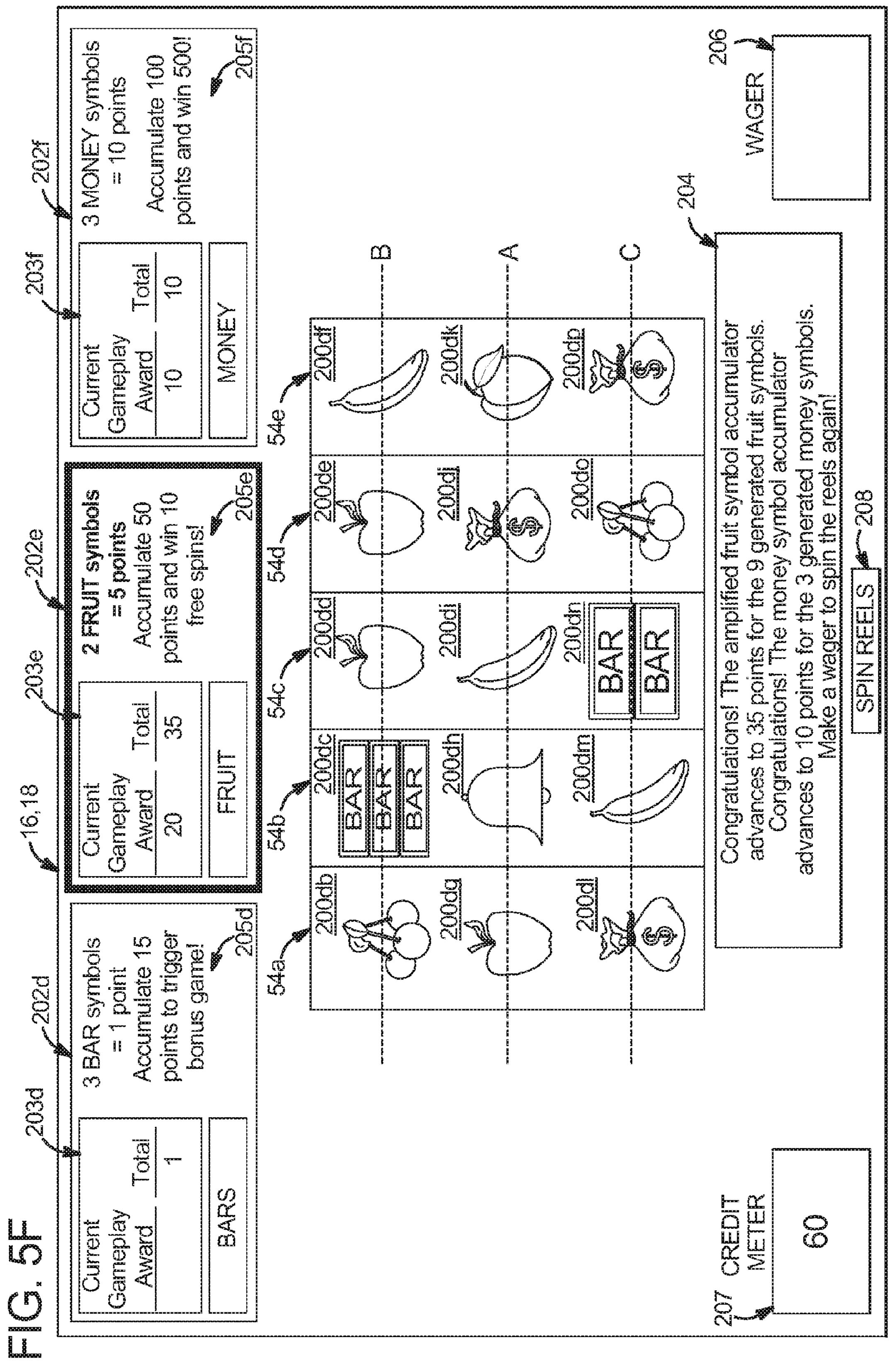

As illustrated in FIG. 5F, the reels 54*a* to 54*e* display a combination of symbols after the reels have stopped spinning. It should be appreciated that in this example, the player is not provided with a primary game award because the gaming system did not generate and display a predetermined primary winning symbol combination.

In FIG. 5F, the fruit symbol accumulator 202*e*, and the money symbol accumulator 202*f* each advance because each of the accumulator advancement triggering events associated with these accumulators occurred. More specifically, the fruit symbol accumulator 202*e* advances twenty points, as illustrated by the accumulator point meter 203*e*, because the gaming system generated nine fruit symbols (i.e., 200*db*, 200*dd*, 200*de*, 200*df*, 200*dg*, 200*di*, 200*dk*, 200*dm*, and 200*do*). The money symbol accumulator 202*f* advances ten points, as illustrated by the accumulator point meter 203*f*, because the gaming system generated three money symbols (i.e., 200*dj*, 200*dl*, and 200*dp*). An appropriate message such as CONGRATULATIONS! THE AMPLIFIED FRUIT SYMBOL ACCUMULATOR ADVANCES TO 35 POINTS FOR THE 9 GENERATED FRUIT SYMBOLS. CONGRATULATIONS! THE MONEY SYMBOL ACCUMULATOR ADVANCES 10 POINTS FOR THE 3 GENERATED MONEY SYMBOLS. MAKE A WAGER TO SPIN THE REELS AGAIN!" is provided to the player visually, such as in the message display 204, or through suitable audio or audiovisual displays.

Figure 5G:
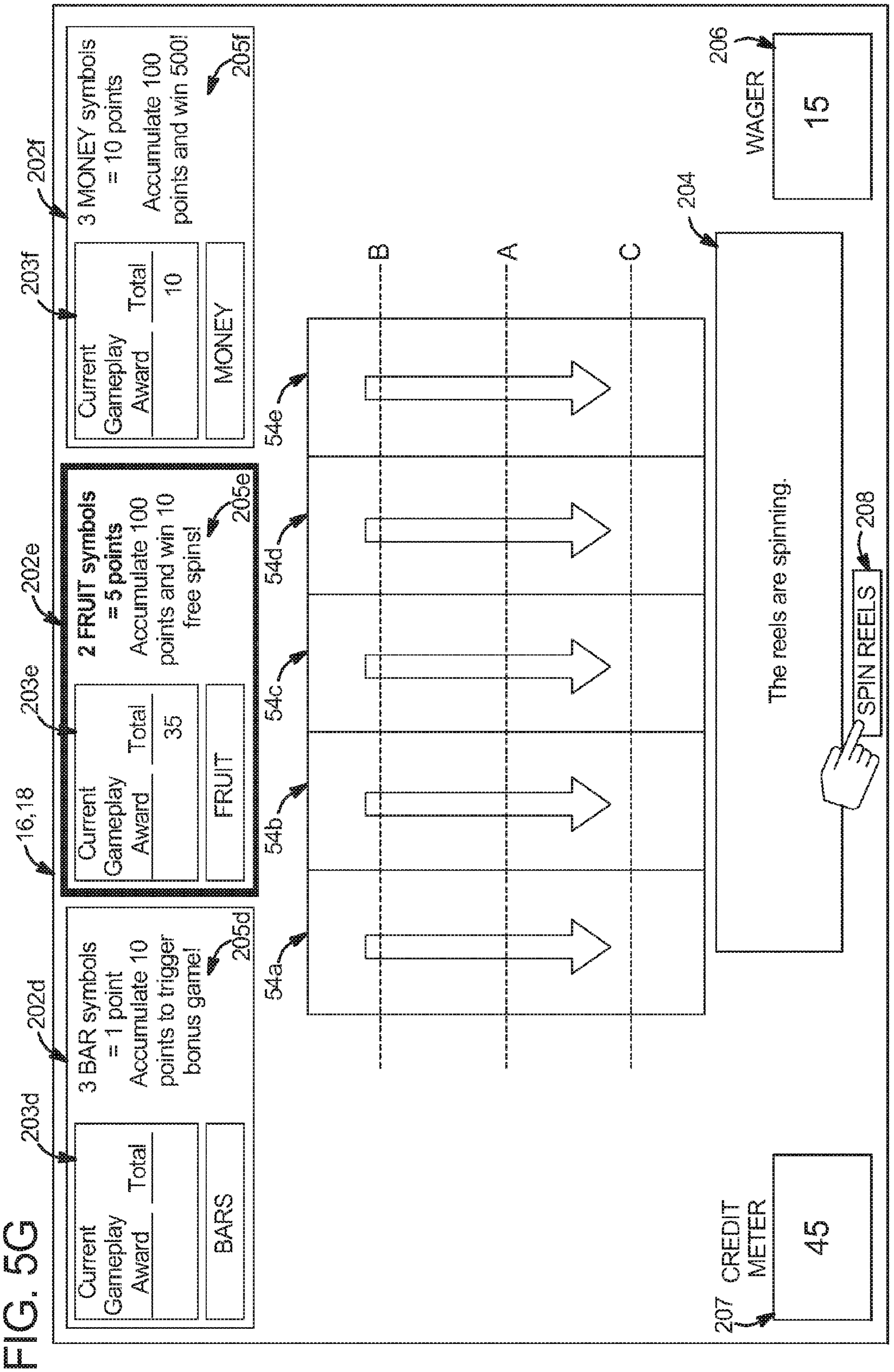
Figure 5H:
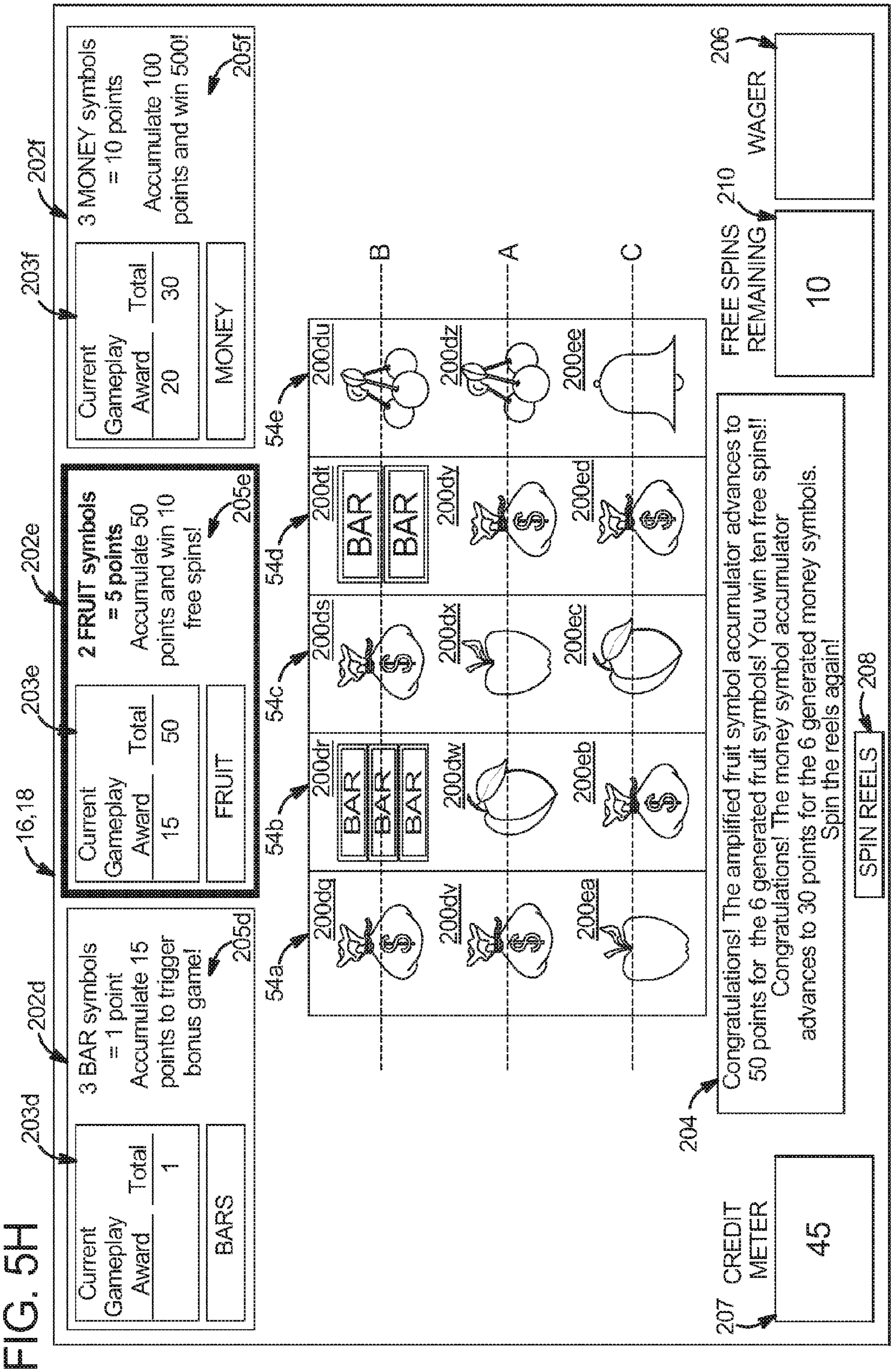

As illustrated in FIG. 5G, the player pushes the spin reels button 208 to place the wager to initiate a play of the primary game. Accordingly, the wager meter 206 displays the number fifteen, and the credit meter 207 displays the player's remaining credits after using fifteen of the credits to make the wager. That is, the credit meter 207 shows the number forty-five to reflect the player's remaining credits. Upon receiving the player's wager, the gaming system causes the reels 54*a*, 54*b*, 54*c*, 54*d*, and 54*e* to spin, as seen in FIG. 5G. In FIG. 5H, the reels 54*a* to 54*e* display a combination of symbols after the reels have stopped spinning.

In FIG. 5H, the fruit symbol accumulator 202*e* and the money symbol accumulator 202*f* each advance because each of the accumulator advancement triggering events associated with these accumulators occurred. More specifically, the fruit symbol accumulator 202*e* advances fifteen points, as illustrated by the accumulator point meter 203*e*, because the gaming system generated six fruit symbols (i.e., 200*du*, 200*dw*, 200*dx*, 200*dz*, 200*ea*, and 200*ec*). The money symbol accumulator 202*f* advances ten points, as illustrated by the accumulator point meter 203*f*, because the gaming system generated six money symbols (i.e., 200*dq*, 200*ds*, 200*dv*, 200*dy*, 200*eb*, and 200*ed*).

In FIG. 5H, the bonus triggering event occurs because the an accumulator reached a designated level. More specifically, the fruit symbol accumulator 202*e* reached a designated level of fifty points, as indicated by the message display 205*e*. The gaming system provides an award of ten free spins to the player because the fruit symbol accumulator 202*e* reached fifty points. An appropriate message such as "CONGRATULATIONS! THE AMPLIFIED FRUIT SYMBOL ACCUMULATOR ADVANCES TO 50 POINTS FOR THE 6 GENERATED FRUIT SYMBOLS! YOU WIN TEN FREE SPINS! CONGRATULATIONS! THE MONEY SYMBOL ACCUMULATOR ADVANCES TO 30 POINTS FOR THE 6 GENERATED MONEY SYMBOLS. SPIN THE REELS AGAIN!" is provided to the player visually, such as in the message display 204, or through suitable audio or audiovisual displays.

Referring to FIGS. 6A to 6D, this embodiment generally shows an example illustrating the accumulator triggering event based upon the outcome of characteristic comparisons. In this example, for each accumulator, if the characteristic of strength value associated with the accumulator is higher than the characteristic of strength value associated with a corresponding generated symbol, that accumulator advances. If the strength value associated with the accumulator is not higher than the strength value associated with the corresponding generated primary symbol, that accumulator decreases. In this example, the gaming system provides an award when an accumulator reaches a designated level.

Figure 6A:
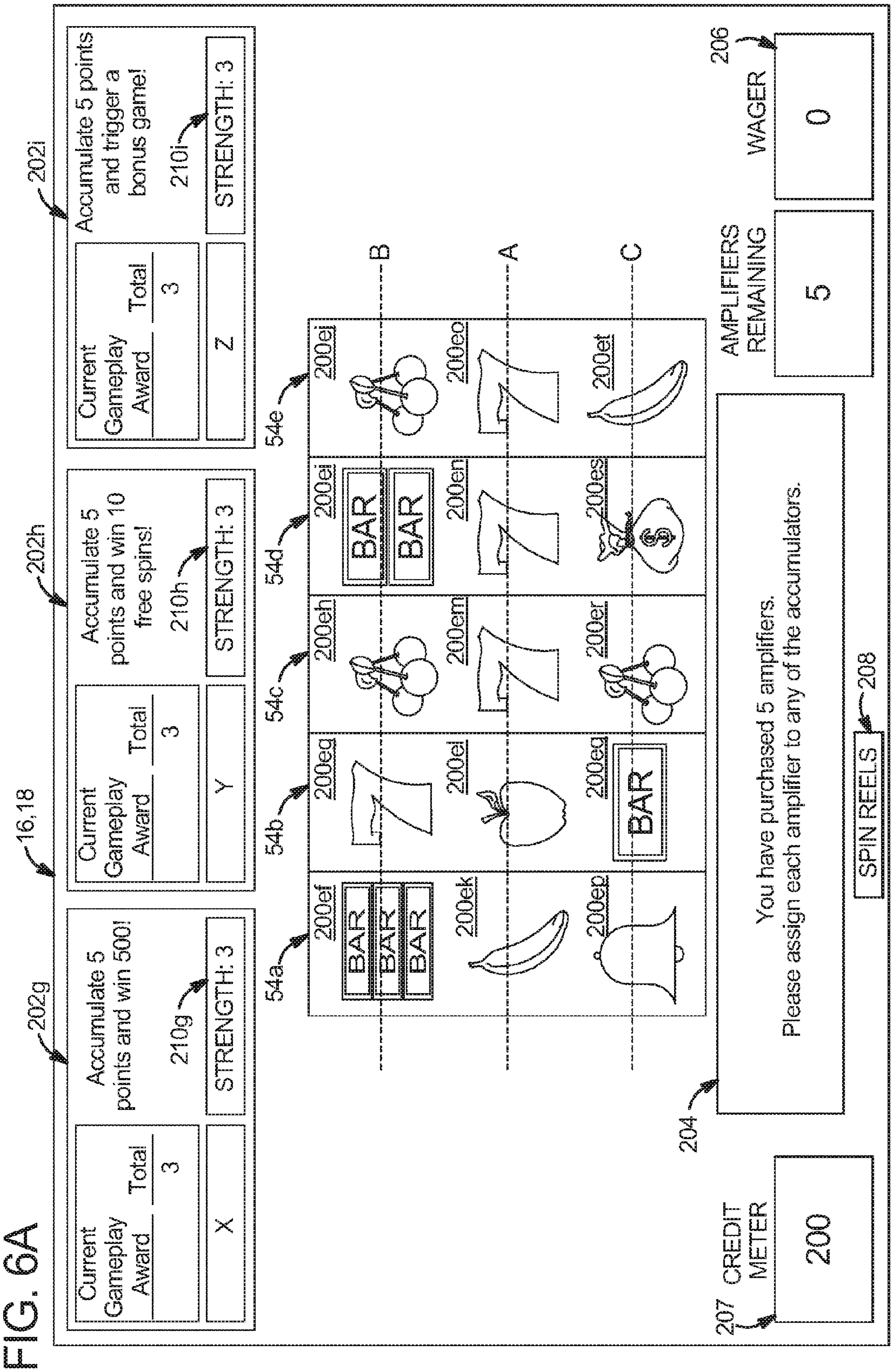
FIGS. 6A, 6B, 6C, 6D and 6E are front views of one embodiment of displays of the gaming system disclosed herein, illustrating the accumulator advancement triggering event being based on an outcome of comparisons.

In FIG. 6A, the display device 16 or 18 displays a plurality of accumulators 202*g*, 202*h* and 202*i*. More specifically, the display device displays an X symbol accumulator 202*g*, a Y symbol accumulator 202*h* and a Z symbol accumulator 202*i*. Each accumulator includes a corresponding accumulator point meter.

In this example embodiment, each of the accumulators 200*g*, 200*h* and 200*i* are associated with a different accumulator advancement triggering event. The accumulator advancement triggering event for each of the accumulators 200*g*, 200*h* and 200*i* is based on an outcome of characteristic comparisons. In this example, each accumulator is associated with a strength characteristic or value. The X symbol accumulator 202*g* is associated with an initial strength value of three, as indicated by the accumulator strength meter 210*g*. The Y symbol accumulator 202*h* is associated with an initial strength value of three, as indicated by the accumulator strength meter 210*h*. The Z symbol accumulator 202*i* is associated with an initial strength value of three, as indicated by the accumulator strength meter 210*i*. In different embodiments, the determination of the initial strength value associated with each accumulator is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In this example, a plurality of symbols are each associated with a strength characteristic or value. In different embodiments, the determination of the strength value associated with each of a plurality of symbols is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

Figure 6B:
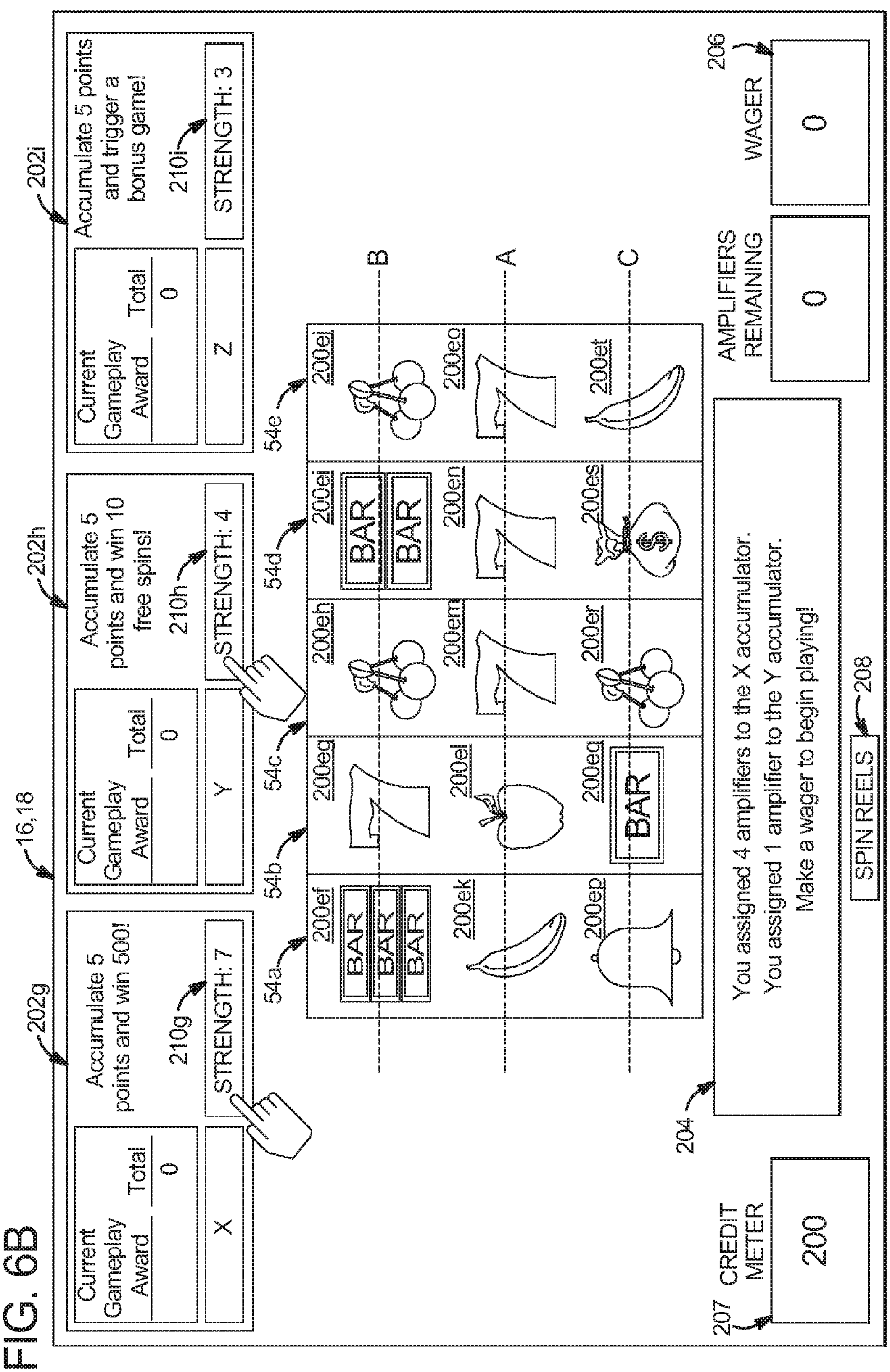

The display device 16 or 18 displays an audio, visual, or audiovisual message 204 informing the player that the player purchased five amplifiers, as illustrated in FIG. 6A. The gaming system enables the player to individually assign each purchased amplifier to any of the accumulators. As shown in FIG. 6B, the player assigned four amplifiers to the X symbol accumulator and one amplifier to the Y symbol accumulator. The gaming system displays an indication to the player that the X symbol accumulator 202*g* and the Y symbol accumulator have been assigned with the purchased amplifiers by increasing the strength value for the X symbol accumulator and the Y symbol accumulator. That is, the strength value associated with the X symbol accumulator 202*g* is increased from three to seven and the Y symbol accumulator is increased from three to four because of the respective assigned amplifiers.

The assignment of an amplifier causes an increase in the strength value for that accumulator. Such an increase in strength value causes an increase to the rate of advancement of the X symbol accumulator 200*h* and the Y symbol accumulator 200*i* because the accumulator advancement triggering event for these accumulators is more likely to occur more often. More specifically, because the strength value of the X symbol accumulator 200*h* and the strength value of the Y symbol accumulator has increased, the strength values associated with these accumulators will more likely be higher than the strength values associated with corresponding generated symbols. An appropriate message such as "YOU ASSIGNED 4 AMPLIFIERS TO THE X ACCUMULATOR. YOU ASSIGNED 1 AMPLIFIER TO THE Y ACCUMULATOR. MAKE A WAGER TO BEGIN PLAYING" is provided to the player visually, such as in the message display 204, or through suitable audio or audiovisual displays.

Figure 6C:
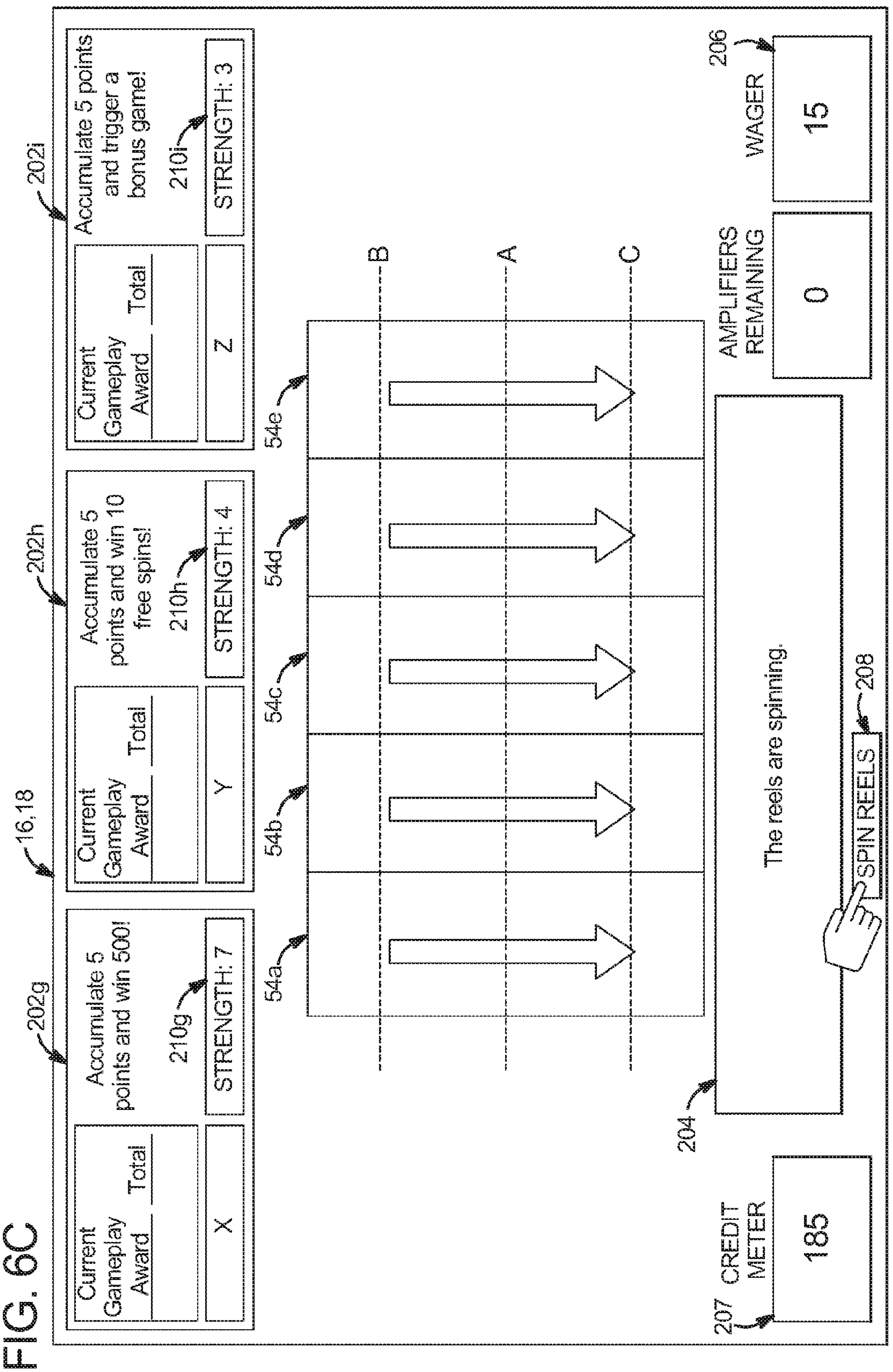
Figure 6D:
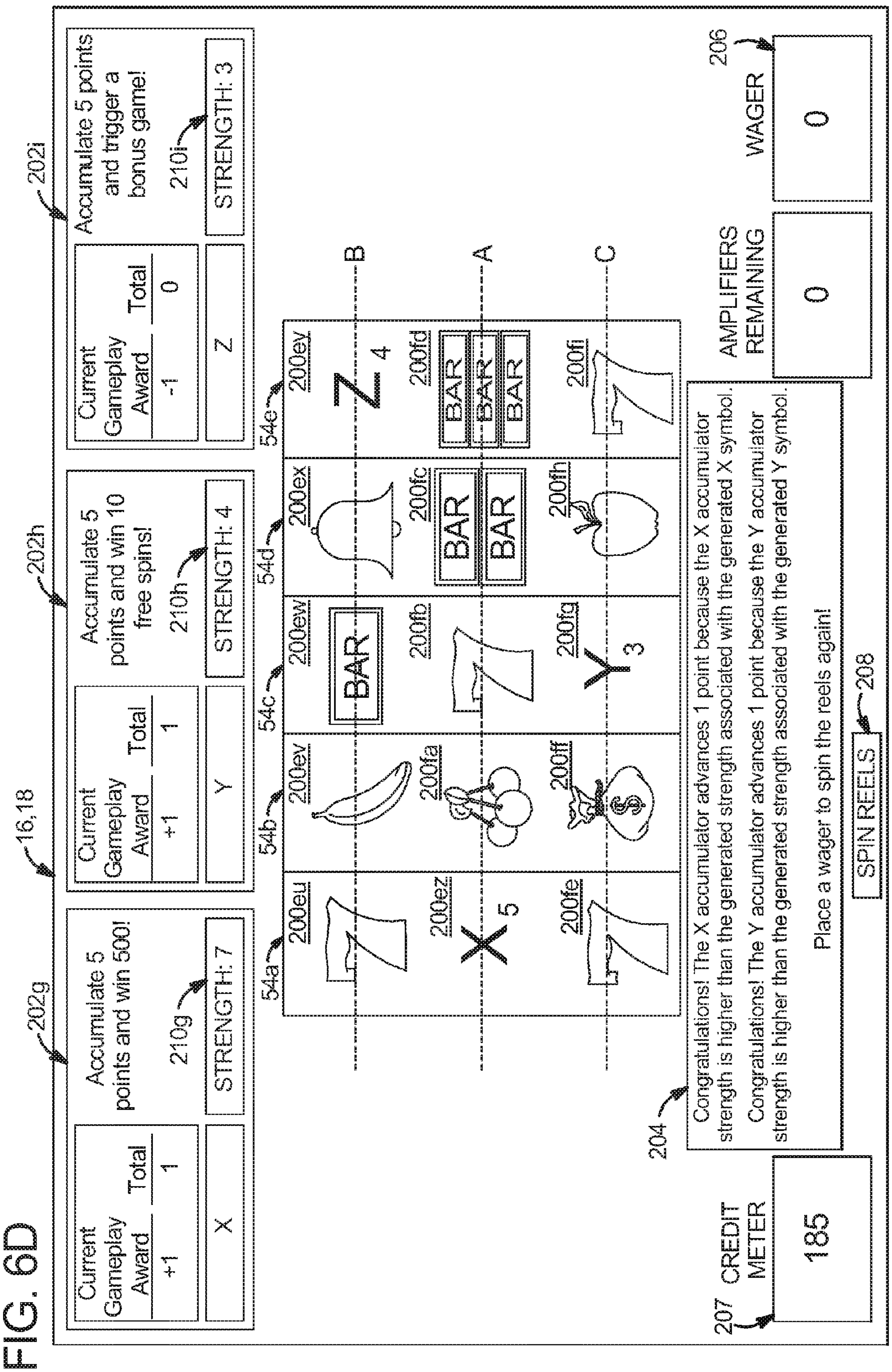

As illustrated in FIG. 6C, the player pushes the spin reels button 208 to place the wager to initiate a play of the primary game. When the player pushes the spin reels button 208, the number of credits shown in the credit meter 207 decreases by fifteen (i.e., the amount of credits wagered), and the number of credits shown in the wager meter 206 increases by fifteen. Accordingly, the wager meter 206 displays the number fifteen, and the credit meter 202 displays the player's remaining credits after using fifteen of the credits to make the wager. That is, the credit meter 207 shows the number seventy-five to reflect the player's remaining credits. It should be appreciated that the fifteen credit wager is the sum of the player's wager on each of the paylines A, B and C. That is, in this example, the player wagered five credits on each of the paylines A, B and C. Upon receiving the player's wager, the gaming system causes the reels 54*a*, 54*b*, 54*c*, 54*d*, and 54*e* to spin, as seen in FIG. 6C. In FIG. 6D, display device 16 or 18 displays the reels 54*a*, 54*b*, 54*c*, 54*d*, and 54*e* after they have stopped spinning. The reels 54*a*, 54*b*, 54*c*, 54*d*, and 54*e* indicate a combination of symbols on the paylines.

In FIG. 6D, the X symbol accumulator 202*g* and the Y symbol accumulator 202*h* each advance because each of the accumulator advancement triggering events associated with these accumulators occurred. More specifically, the X symbol accumulator 202*g* advances one point, as illustrated by the accumulator point meter 203*g*, because the strength value associated with the X symbol accumulator 202*g* (i.e., seven) is higher than the strength value associated with the generated X symbol 200*ez* (i.e., five). The Y symbol accumulator 202*h* advances one point, as illustrated by the accumulator point meter 203*h*, because the strength value associated with the Y symbol accumulator (i.e., four) is higher than the strength value associated with the generated Y symbol 200*fg* (i.e., three). It should be appreciated that the Z symbol accumulator does not advance because the strength value associated with the Z accumulator (i.e., three) is not higher than the strength value associated with the generated Z symbol 200*ey* (i.e., four). An appropriate message such as "CONGRATULATIONS! THE X ACCUMULATOR ADVANCES 1 POINT BECAUSE THE X ACCUMULATOR STRENGTH IS HIGHER THAN THE GENERATED STRENGTH ASSOCIATED WITH THE GENERATED X SYMBOL. CONGRATULATIONS! THE Y ACCUMULATOR ADVANCES 1 POINT BECAUSE THE Y ACCUMULATOR STRENGTH IS HIGHER THAN THE GENERATED STRENGTH ASSOCIATED WITH THE GENERATED Y SYMBOL. PLACE A WAGER TO SPIN THE REELS AGAIN!" is provided to the player visually, such as in the message display 204, or through suitable audio or audiovisual displays.

Figure 6E:
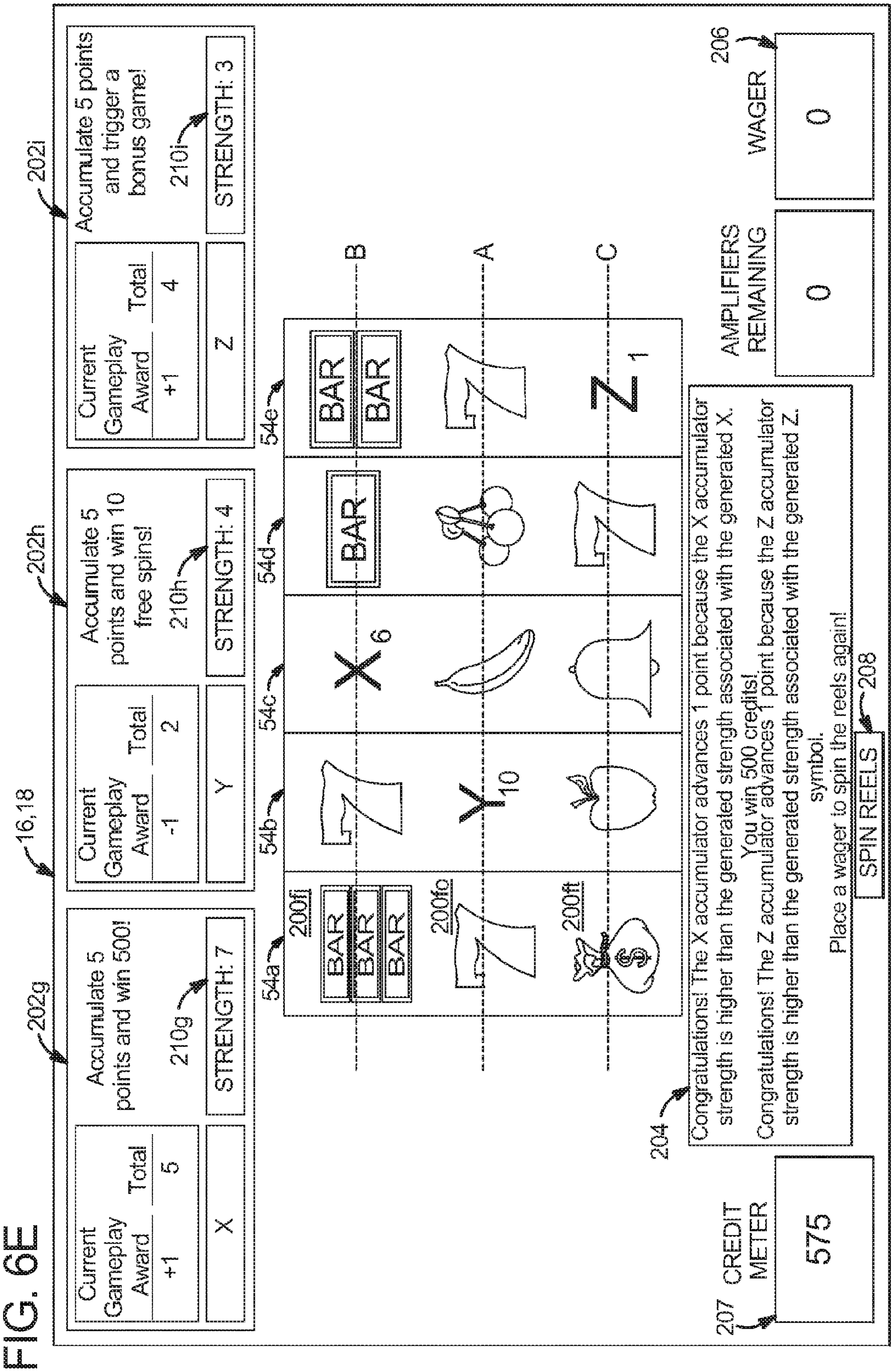

FIG. 6E illustrates a subsequent game play in which the player had previously accumulated (i.e., before the current game play illustrated in FIG. 6E) three additional points for the X symbol accumulator 202*g*, two additional points for the Y symbol accumulator 202*h* and three points for the money symbol accumulator 202*i*.

In FIG. 6E, the X symbol accumulator 202*g* and the Z symbol accumulator 202*i* each advance because each of the accumulator advancement triggering events associated with these accumulators occurred. More specifically, the X symbol accumulator 202*g* advances one point, as illustrated by the accumulator point meter 203, because the strength value associated with the X symbol accumulator 202*g* (i.e., seven) is higher than the strength value associated with the generated X symbol 200*fl* (i.e., six). The Z symbol accumulator 202*i* advances one point, as illustrated by the accumulator point meter 203*i*, because the strength value associated with the Z symbol accumulator (i.e., three) is higher than the strength value associated with the generated Z symbol 200*fx* (i.e., one). The Y symbol accumulator 202*h* decreases because the strength value associated with the Y accumulator 202*h* (i.e., four) is not higher than the strength value associated with the generated Y symbol 200*fp* (i.e., ten). An appropriate message such as "CONGRATULATIONS! THE X ACCUMULATOR ADVANCES 1 POINT BECAUSE THE X ACCUMULATOR STRENGTH IS HIGHER THAN THE GENERATED STRENGTH ASSOCIATED WITH THE GENERATED X. YOU WIN 500 CREDITS! CONGRATULATIONS! THE Z ACCUMULATOR ADVANCES 1 POINT BECAUSE THE Z ACCUMULATOR STRENGTH IS HIGHER THAN THE GENERATED STRENGTH ASSOCIATED WITH THE GENERATED Z SYMBOL. PLACE A WAGER TO SPIN THE REELS AGAIN!" is provided to the player visually, such as in the message display 204, or through suitable audio or audiovisual displays.

In one alternative embodiment, if the strength value associated with the any of the symbol accumulators 202*g*, 202*h* or 202*i* is higher than the strength value associated with a generated X, Y, or Z symbol, the gaming system advances the strength value associated with the accumulator.

In one alternative embodiment, the amount of advancement increases depending on the outcome of the differences in strength value comparisons. For example, in one embodiment, the gaming system provides a red accumulator having a strength value of ten. The gaming system also provides a blue accumulator having a strength value of five. In this embodiment, the gaming system generates a red symbol having a strength value of six and a blue symbol having a strength value of four. In this example, the red accumulator advances four points because the strength of the red accumulator (i.e., ten) is four units higher than the strength of the red symbol (i.e., six). Also, the blue accumulator advances one point because the strength of the blue accumulator (i.e., five) is one point higher than the strength of the generated blue symbol (i.e., four).

In one alternative embodiment, the bonus triggering event occurs when the strength of one or more of the accumulators reach a designated level.

In one alternative embodiment, the awards provided to the player in the bonus game are based on an outcome of strength comparisons. In one embodiment, the gaming system provides an award based on the strength of one or more accumulators. In one embodiment, the gaming system provides an award based on an outcome of strength comparisons. In one embodiment, the gaming system provides an award of extra free spins wherein each accumulator begins with a designated strength.

As mentioned above, in one embodiment, a plurality of the accumulators are each initially associated with a different normal or default rate of advancement. For example, in one embodiment, the gaming system provides a red accumulator, a blue accumulator and a green accumulator. In this example, the red accumulator's normal rate of advancement is to advance one point if the gaming system generates three red symbols. The blue accumulator's normal rate of advancement is to advance one point if the gaming system generates two blue symbols. The red accumulator's normal rate of advancement is to advance one point if the gaming system generates five green symbols.

In different embodiments, the determination of the initial normal or default rate of advancement is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, after the gaming system provides the player with any awards associated with the level of one or more accumulators, the level of each accumulator is reset to zero. In another embodiment, after the gaming system provides the player with any awards associated with the level of one or more accumulators, the accumulator that triggered the bonus event is reset to zero. That is, in this embodiment, the level of one or more of the accumulators remains for subsequent plays of the game.

In one embodiment, the gaming system causes an accumulator to stop advancing when the point level associated with that accumulator reaches a designated level. In one example embodiment, the gaming system provides a green symbol accumulator associated with extra paylines. In this example, the gaming system prevents the point level associated with the green symbol accumulator from advancing above fifteen points. Accordingly, the maximum quantity of extra payline awards associated with the green symbol accumulator is fifteen.

In one embodiment, an accumulator assigned with an amplifier continues to advance during any subsequently played bonus game free spins.

In one embodiment, for each of the accumulators, the gaming system does not display to the player the quantity of the points associated with these accumulators until the bonus triggering event occurs.

In one embodiment, the gaming system displays each of the amplifiers as a symbol. It should be appreciated that the symbols representing the amplifiers may be numbers, letters, shapes, characters or any other suitable images or indicia.

It should be appreciated that the gaming system can indicate that an accumulator has been assigned with an amplifier in any suitable manner. In one embodiment, the gaming system displays an indication that an accumulator has been assigned with an amplifier by highlighting that accumulator. In one embodiment, the gaming system displays an indication that an accumulator has been assigned with an amplifier by using an illumination device associated with the accumulators. It should be appreciated that any suitable color, shape, symbol or image may be employed in a game to indicate or otherwise identify an accumulator assigned with an amplifier.

In one embodiment, the gaming system determines whether to provide the player any amplifiers. In one embodiment, the gaming system provides one or more amplifiers when the player deposits a designated amount of money with the gaming system. In one embodiment, the gaming system provides one or more amplifiers if the player places a wager on the primary game. In another embodiment, the gaming system provides one or more amplifiers if the player places one or more side wagers. In one embodiment, the gaming system provides one or more amplifiers upon the occurrence of a triggering event. For example, in one such embodiment, if the triggering event occurs, the gaming system provides the player with an amplifier for the next ten spins of the primary game. In different embodiments, the determination to provide any amplifiers is predetermined, randomly determined, determined based on the player's status (such as determined through a player tracking system), determined based on a generated symbol or symbol combination, determined based on a random determination by the central controller, determined based on a random determination at the gaming system, determined based on time (such as the time of day), determined based on an amount of coin-in accumulated in one or more pools or determined based on any other suitable method or criteria.

In one embodiment, the gaming system determines a number of amplifiers to provide to the player. In one embodiment, the number of amplifiers to provide is predetermined. For example, in one embodiment, after a player deposits an amount of money on the gaming system, the gaming system provides one amplifier to the player. In one embodiment, the number of amplifiers to provide is determined based on a triggering event. In one such embodiment, the number of amplifiers to provide is determined based on a number of designated symbols generated in the play of the primary game, such as generated on the plurality of reels. For example, if the triggering event is the generation of at least three designated symbols scattered at any symbol position on the plurality of reels, the generation of three designated symbols results in providing the player three amplifiers, the generation of four designated symbols results in providing the player four amplifiers and the generation of five designated symbols results in providing the player five amplifiers.

In different embodiments, the number of amplifiers to provide is randomly determined, determined based on the player's status (such as determined through a player tracking system), determined based on a generated symbol or symbol combination, determined based on a random determination by the central controller, determined based on a random determination at the gaming system, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In another embodiment, the number of amplifiers to provide to the player is independent of any wager the player places. In this embodiment, the gaming system determines the number of amplifiers to provide to the player regardless of the amount of the player's wager, the timing of the player's wager, the quantity of wagers placed and/or any side bet or side wager placed.

In different embodiments, the gaming system enables a player to selectively assign or apply: (i) each of a plurality of amplifiers to a single accumulator; (ii) a plurality of amplifiers to a single accumulator; (iii) a plurality of amplifiers to each of a plurality of accumulators; a plurality of different amplifiers to a plurality of different accumulators. Such embodiments enable the player to determine how many amplifiers to assign to an accumulator by considering the ramifications of assigning a plurality of amplifiers to a plurality of accumulators or assigning a plurality of amplifiers to a single accumulator. That is, the gaming system provides the player one or more decisions regarding how volatile the player wants the game and their overall gaming experience to be. It should be appreciated that in one embodiment, the gaming system enables the player to assign one or more amplifiers to all of the provided accumulators.

In one embodiment, each provided amplifier is the same (i.e., causes the same increase in the rate of advancement). In another embodiment, each provided amplifier is different (i.e., causes a different increase in the rate of advancement). In another embodiment, a plurality of the provided amplifiers are each different. In different embodiments, the value of the increase in the rate of advancement is predetermined, randomly determined, determined based on the player's status (such as determined through a player tracking system), determined based on a generated symbol or symbol combination, determined based on a random determination by the central controller, determined based on a random determination at the gaming system, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one embodiment, when an amplifier is assigned to an accumulator, the amplifier causes a temporary increase in the rate of advancement for that accumulator. More specifically, in one example embodiment, for each assigned amplifier the increase in the rate of advancement stops after five game plays. In another embodiment, the increase in the rate of advancement stops after a designated amount of time such as two minutes. In an alternative embodiment, when an amplifier is assigned to an accumulator, the amplifier causes an increase in the rate of advancement for that accumulator until a triggering event occurs. In one such embodiment, the increase in the rate of advancement for the accumulator occurs until the player has no more credits remaining. It should be appreciated that triggering event can be any suitable triggering event.

In one embodiment, each assigned amplifier causes an increase to the rate of advancement of an accumulator because the amplifier causes both the accumulator advancement triggering event for that accumulator to be more likely to occur more often and the accumulator to increase at a greater rate for each occurrence of an accumulator advancement triggering event.

As mentioned above, in one embodiment, the rate of advancement of an accumulator is increased because an assigned amplifier causes an accumulator advancement triggering event to be more likely to occur more often. In one such embodiment, the accumulator advancement triggering event is more likely to occur more often because the gaming system increases the probability associated with the occurrence of such an accumulator advancement triggering event to occur.

In one embodiment, the accumulator advancement triggering event is more likely to occur more often because the gaming system increases the quantity of available symbols associated with the occurrence of that accumulator advancement triggering event. More specifically, in one example embodiment, the gaming system provides a red symbol accumulator which advances if the gaming system generates three red symbols. In this example embodiment, before an amplifier is assigned to the red symbol accumulator, the gaming system includes a plurality of reels which include, among other symbols, twenty red symbols. When the red symbol accumulator is assigned with an amplifier, the gaming system doubles the quantity of red symbols included on the plurality of reels. Accordingly, the accumulator advancement triggering event is more likely to occur more often for this red symbol accumulator because the gaming system doubled the quantity of red symbols available to cause the accumulator advancement triggering event to occur for the red symbol accumulator. In another example embodiment, the gaming system provides a green symbol accumulator. Prior to an amplifier being assigned to the green amplifier, the green symbol accumulator advances if the gaming system generates three green symbols. In this example, after the green symbol accumulator is assigned with an amplifier, the green symbol accumulator advances when the gaming system generates a total of three green or three blue symbols. Accordingly, the accumulator advancement triggering event is more likely to occur more often for this green symbol accumulator.

In one embodiment the assignment of an amplifier to an accumulator causes the accumulator advancement triggering event to be more likely to occur more often for that accumulator because the assigned amplifier causes both an increase in the number of available symbols required to cause the accumulator advancement triggering event to occur and a reduction in the number of symbols required to cause the accumulator advancement triggering event to occur.

In one embodiment, the player is enabled to change the assignment of the amplifier to a different accumulator after a play of the game.

In one embodiment, after the player is provided with at least one amplifier, the player is enabled to apply to the amplifier when the player chooses. That is, the player does not have to apply the amplifier when the gaming system provides the amplifier.

In one embodiment, when the player assigns an amplifier to an accumulator, the amplifier activates that accumulator. In this embodiment, if an accumulator does not have an amplifier assigned to it, the accumulator cannot advance or accumulate.

In various alternative embodiments, the accumulator advancement triggering event may be based on but not limited to at least one of: (i) an amount of time played on the gaming system; (ii) a random time of the day; (iii) an amount of money wagered on the gaming system; (iv) an amount of money lost at the gaming system; (v) an amount of money won at the gaming system; (vi) an amount of money wagered at games in a gaming system; (vii) an amount of money lost at the gaming systems in a gaming system; (viii) an amount of money won at the gaming systems in a gaming system; (ix) an event or outcome occurring in the primary game of one of the gaming systems; (x) an event occurring due to a shared random outcome generation; (xi) meeting one or more thresholds, such as a number of plays or a wager pool exceeding a designated amount; (xii) a random determination based on an amount wagered; (xiii) an occurrence of a predetermined event; (xiv) one or more side wagers placed; and (xv) any combination of these.

In one embodiment, the accumulator advancement triggering event is based on a predetermined combination of subsymbols. In one example embodiment, a plurality of game symbols are each associated with a subsymbol. In this example embodiment, the subsymbols are displayed as battleship game symbols such as a jet, ship or submarine symbol. In this example, the gaming system provides three different symbol accumulators. The first symbol accumulator is associated with the jet subsymbols. The second symbol accumulator is associated with the ship subsymbols. The third symbol accumulator is associated with the submarine subsymbols. In operation of this embodiment, if the gaming system generates three or more of the same subsymbols (i.e., the jet, ship or submarine subsymbols) along a payline, the corresponding accumulator advances.

In one embodiment, the accumulator advancement triggering event is based on an outcome of a secondary game. For example, in different embodiments, the accumulator advancement triggering event is based on any suitable player input selection game, any puzzle-type game, and any suitable offer and acceptance game, any spinning wheel game, or a game that employs falling balls or a puck in a quincunx.

In one embodiment, the gaming system determines an amount of advancement for each accumulator. In one embodiment, the determination of the amount of advancement for an accumulator is randomly determined. In different embodiments, the determination of the amount of advancement for the accumulator is predetermined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, an accumulator assigned with an amplifier advances if when a bonus triggering event occurs. It should be appreciated that the bonus triggering event may be triggered by any suitable symbol-driven triggering events or other events based on primary game play and triggering events that are random and independent of primary game play, such as a randomized time or set time of day or a separate random or other determination. In various alternative embodiments, the triggering event may be based on but not limited to at least one of: (i) an amount of time played on the gaming system; (ii) a random time of the day; (iii) an amount of money wagered on the gaming system; (iv) an amount of money lost at the gaming system; (v) an amount of money won at the gaming system; (vi) an amount of money wagered at games in a gaming system; (vii) an amount of money lost at the gaming systems in a gaming system; (viii) an amount of money won at the gaming systems in a gaming system; (ix) an event or outcome occurring in the primary game of one of the gaming systems; (x) an event occurring due to a shared random outcome generation; (xi) meeting one or more thresholds, such as a number of plays or a wager pool exceeding a designated amount; (xii) a random determination based on an amount wagered; (xiii) an occurrence of a predetermined event; (xiv) one or more side wagers placed; and (xv) any combination of these.

In one embodiment, the bonus triggering event occurs when an accumulator assigned with an amplifier reaches a designated level. In this example, the accumulators not assigned with an amplifier provide bonus parameters in the bonus event after the bonus triggering event occurs.

In different embodiments, the awards associated with the accumulators include, but are not limited to: a quantity of free activations of one or more games; an applicable multiplier for at least one, a plurality or each of the free spins; a credit amount (based on a triggering event and/or a wager placed); a quantity of picks in the game; a quantity of selections in the game; a quantity of retrigger symbols in the game; a quantity of terminators or termination symbols in the game; a quantity of anti-terminators in the game; a quantity of locking reels in the game; a quantity of locking symbol positions in the game; a quantity of expanding symbols in the game; a quantity of rounds or levels in the game; a quantity of award opportunities in the game; a quantity of progressive awards in the game; a range of available awards in the game; a quantity of active reels in the game; a quantity of offers in the game; a paytable which will be utilized in the game; a quantity of hands of playing cards in the game; any combination thereof; and any other suitable award. In one embodiment, the award associated with the accumulator includes an activation of an additional win opportunity such as a two way pays feature.

In one embodiment, each of the awards associated with the plurality of accumulators are the same. In another embodiment, a plurality of the awards associated with the plurality of accumulators are different.

In one embodiment, the value of the awards associated with the level of the accumulators have a linear relationship with the level of the accumulators. For example, in one embodiment, an accumulator is associated with an award of extra free spins. In this example, after the bonus triggering event, if the level of an accumulator is one, the gaming system provides one extra free spin. If the level of the accumulator is two, the gaming system provides two extra free spins. If the level of the accumulator is three, the gaming system provides three extra free spins.

In another embodiment, the value of the awards associated with the level of the accumulators have an exponential relationship with the level of the accumulators. For example, in one embodiment, an accumulator is associated with an award of extra free spins. In this example, after the bonus triggering event occurs, if the level of an accumulator is one, the gaming system provides one extra free spin. If the level of the accumulator is two, the gaming system provides two extra free spins. If the level of the accumulator is three, the gaming system provides five extra free spins.

In one embodiment, the gaming system provides a designated number of multipliers which can each be assigned to a designated number of accumulators. In one embodiment, the gaming system enables the player to assign each multiplier to one of the accumulators. In one embodiment, when a multiplier is assigned to an accumulator, the multiplier multiplies the award associated with that accumulator when the gaming system provides such award. More specifically, in one example embodiment wherein the gaming system provides a red symbol accumulator associated with a bonus game multiplier award, a blue symbol accumulator associated with a free spin bonus game award, and a green symbol accumulator associated with an extra payline award, the gaming system also provides the player with a set of multipliers (for example, a "2×" multiplier, a "5×" multiplier, and a "0.5×" multiplier). In this example embodiment, the gaming system enables the player to assign each of these multipliers to one of the accumulators provided. Thus, when the gaming system provides any of the awards associated with a respective accumulator (as described above), the respective assigned multiplier multiplies the value of the award associated for that accumulator. It should be appreciated that in this example embodiment, that the assigned "0.5" multiplier decreases the value of the award associated with the accumulator assigned with this multiplier.

In one embodiment, the player does not know which award is associated with one or more of the accumulators until after the occurrence of the bonus triggering event. For example, in one embodiment, the gaming system provides a blue symbol accumulator, a red symbol accumulator and a green symbol accumulator. In this example, the player assigns an amplifier to the blue symbol accumulator. In this example, the player accumulates points for each of the accumulators during a plurality of primary game plays. When the bonus triggering event occurs, the gaming system assigns each of the blue, red and green symbol accumulators a random award (i.e., free spins, multipliers, cash, or any other suitable component). In this example embodiment, when the player had originally assigned the amplifier to the blue symbol accumulator, the player had no knowledge of which award would be subsequently assigned to the blue symbol accumulator.

In one embodiment, the gaming system and/or the player tracking system tracks the earned points for each of the accumulators at the gaming system. In this embodiment, the player is enabled to end a first game play and start a second game play, at a later time. When the player starts the second game play, the player tracking system enables the player to begin with the same earned points for each of the accumulators the player earned when the player ended the first game play. In one embodiment, the earned points for the accumulators are stored for a specific gaming device. In another embodiment, in a server based gaming system, a network server stores the earned points and thus the player is enabled to play any of the gaming devices connected to the network using the stored earned points. In another embodiment, the gaming system and/or player tracking system does not track any earned points for any of the accumulators when a player completes a game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one display device supported by the housing;

a plurality of input devices supported by the housing and including an acceptor;

at least one processor; and at least one memory device that stores a plurality of instructions that, when executed by the at least one processor, cause the at least one processor to operate with the at least one display device and the plurality of input devices to:

(a) establish a credit balance based at least in part on a monetary value associated with a physical item after the physical item is received by an acceptor;

(b) display a plurality of accumulators;

(c) for each of a designated number of amplifiers, enable a player to assign said amplifier to any one of a designated number of the accumulators, wherein: (1) the designated number of amplifiers is at least one, (2) the designated number of the accumulators is at least two, and (3) each accumulator has a default rate of advancement;

(d) for each accumulator assigned with one or more of the amplifiers, display an indication that said accumulator is amplified;

(e) for each accumulator, when an accumulator advancement triggering event occurs for said accumulator, advance said accumulator, wherein: (1) if one or more of the amplifiers is not assigned to the accumulator associated with the accumulator advancement triggering event, said accumulator advancement occurs at the default rate of advancement, and (2) if one or more of the amplifiers is assigned to the accumulator associated with the accumulator advancement triggering event, said accumulator advancement occurs at a greater rate than the default rate of advancement for said accumulator;

(f) if a designated triggering event occurs, determine an award based, at least in part, on a level of one or more of the accumulators, the credit balance increasable by the award; and (g) initiate a payout associated with the credit balance following receipt of an actuation of a cashout button.

2. The gaming system of claim 1, wherein each accumulator includes a meter that displays an accumulated value.

3. The gaming system of claim 1, wherein the accumulators are associated with different awards.

4. The gaming system of claim 1, wherein the plurality of instructions, when executed by the at least one processor, cause the at least one processor to enable the player to assign the designated number of amplifiers following receipt of a side wager.

5. The gaming system of claim 1, wherein the plurality of instructions, when executed by the at least one processor, cause the at least one processor to enable the player to assign a plurality of amplifiers to one accumulator.

6. The gaming system of claim 1, wherein the plurality of instructions, when executed by the at least one processor, cause the at least one processor to enable the player to assign a plurality of amplifiers to different accumulators.

7. The gaming system of claim 1, wherein the plurality of instructions, when executed by the at least one processor, cause the at least one processor to enable the player to change the assignment of an assigned amplifier to a different accumulator.

8. The gaming system of claim 1, wherein the plurality of instructions, when executed by the at least one processor, cause the at least one processor to cause the accumulator advancement to occur at the greater rate for a designated period of time.

9. The gaming system of claim 1, wherein a plurality of the accumulators are associated with different accumulator advancement triggering events.

10. The gaming system of claim 1, wherein the designated triggering event occurs when one or more of the accumulators reach a designated level.

11. The gaming system of claim 1, wherein the default rates of the accumulators are different.

12. The gaming system of claim 1, wherein the plurality of instructions, when executed by the at least one processor, cause the at least one processor to provide a free spin bonus game if the designated triggering event occurs.

13. The gaming system of claim 12, wherein the award is based, at least in part, on the level of one or more of the accumulators in the free spin bonus game.

14. A gaming system comprising:

a housing;

at least one display device supported by the housing;

a plurality of input devices supported by the housing and including an acceptor;

at least one processor; and at least one memory device that stores a plurality of instructions that, when executed by the at least one processor, cause the at least one processor to operate with the at least one display device and the plurality of input devices to:

(a) establish a credit balance based at least in part on a monetary value associated with a physical item after the physical item is received by an acceptor;

(b) display a plurality of accumulators, wherein each of the plurality of accumulators is associated with an accumulator advancement triggering event;

(c) for each of a designated number of amplifiers, enable a player to assign said amplifier to any one of a designated number of the accumulators, wherein: (1) the designated number of amplifiers is at least one; (2) the designated number of the accumulators is at least two; (3) each assigned amplifier causes the accumulator advancement triggering event to be more likely to occur more often than a default rate for the accumulator each said amplifier is assigned to; and (4) for each accumulator, when the accumulator advancement triggering event occurs for said accumulator, said accumulator advances;

(d) for each accumulator assigned with one or more of the amplifiers, display an indication that said accumulator is amplified;

(f) if a designated triggering event occurs, determine an award based, at least in part, on a level of one or more of the accumulators, the credit balance increasable by the award; and (g) initiate a payout associated with the credit balance following receipt of an actuation of a cashout button.

15. The gaming system of claim 14, wherein each accumulator includes a meter that displays an accumulated value.

16. The gaming system of claim 14, wherein the accumulators are associated with different awards.

17. The gaming system of claim 14, wherein the plurality of instructions, when executed by the at least one processor, cause the at least one processor to enable the player to assign the designated number of amplifiers following receipt of a side wager.

18. The gaming system of claim 14, wherein the plurality of instructions, when executed by the at least one processor, cause the at least one processor to enable the player to assign a plurality of amplifiers to one accumulator.

19. The gaming system of claim 14, wherein the plurality of instructions, when executed by the at least one processor, cause the at least one processor to enable the player to assign a plurality of amplifiers to different accumulators.

20. The gaming system of claim 14, wherein the plurality of instructions, when executed by the at least one processor, cause the at least one processor to enable the player to change the assignment of an assigned amplifier to a different accumulator.

21. The gaming system of claim 14, wherein a plurality of the accumulators are associated with a different accumulator advancement triggering events.

22. The gaming system of claim 14, wherein the plurality of instructions, when executed by the at least one processor, cause the at least one processor to cause the accumulator advancement triggering event to be more likely to occur more often than the default rate for a designated period of time.

23. The gaming system of claim 14, wherein the plurality of instructions, when executed by the at least one processor, cause the at least one processor to cause the accumulator advancement triggering event to be more likely to occur more often than the default rate by reducing a number of symbols required to cause the accumulator advancement triggering event to occur.

24. The gaming system of claim 14, wherein the plurality of instructions, when executed by the at least one processor, cause the at least one processor to cause the accumulator advancement triggering event to be more likely to occur more often than the default rate by increasing a number of available symbols required to cause the accumulator advancement triggering event to occur.

25. The gaming system of claim 14, wherein a plurality of the accumulators are associated with different accumulator advancement triggering events.

26. The gaming system of claim 14, wherein the designated triggering event occurs if one or more of the accumulators reach a designated level.

27. The gaming system of claim 14, wherein the award is one selected from the group consisting of: (i) extra free spins; (ii) extra paylines; (iii) extra cash; (iv) extra wild card symbols; and (v) extra multipliers.

28. The gaming system of claim 14, wherein each of a plurality of the accumulators has a value.

29. The gaming system of claim 28, wherein the plurality of instructions, when executed by the at least one processor, cause the at least one processor to generate at least one symbol associated with at least one accumulator, the at least one symbol having a value.

30. The gaming system of claim 29, wherein the accumulator advancement triggering event occurs if at least one of the values of one of the accumulators is greater than the value of the generated symbol associated with said one of the accumulators.

* * * * *